US012601631B2

(12) United States Patent
Yako et al.

(10) Patent No.: US 12,601,631 B2
(45) Date of Patent: Apr. 14, 2026

(54) FILTER ARRAY AND LIGHT DETECTION SYSTEM

(71) Applicant: Panasonic Intellectual Property Management Co., Ltd., Osaka (JP)

(72) Inventors: Motoki Yako, Osaka (JP); Atsushi Ishikawa, Osaka (JP); Kazuya Hisada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 572 days.

(21) Appl. No.: 18/048,458

(22) Filed: Oct. 21, 2022

(65) Prior Publication Data

US 2023/0069927 A1     Mar. 9, 2023

Related U.S. Application Data

(63) Continuation of application No. PCT/JP2021/015828, filed on Apr. 19, 2021.

(30) Foreign Application Priority Data

May 20, 2020     (JP) ................................. 2020-087974

(51) Int. Cl.
| | |
|---|---|
| *G01J 3/28* | (2006.01) |
| *G02B 5/20* | (2006.01) |
| *G02B 5/28* | (2006.01) |

(52) U.S. Cl.
CPC ............ *G01J 3/2823* (2013.01); *G02B 5/201* (2013.01); *G01J 2003/2826* (2013.01); *G02B 5/284* (2013.01)

(58) Field of Classification Search
CPC ....... G02B 5/201; G02B 5/284; G01J 3/2823; G01J 3/2803; G01J 3/26; G01J 2003/2826; G01J 2003/2806
See application file for complete search history.

(56) References Cited

U.S. PATENT DOCUMENTS

| | | |
|---|---|---|
| 2014/0175265 A1 | 6/2014 | Gonzalez et al. |
| 2016/0138975 A1 | 5/2016 | Ando et al. |

(Continued)

FOREIGN PATENT DOCUMENTS

| | | |
|---|---|---|
| EP | 0 442 738 | 8/1991 |
| FR | 3 084 459 | 1/2020 |

(Continued)

OTHER PUBLICATIONS

T. Bauer, Heidi Thome, Thomas Eisenhammer, "Bandpass filter arrays patterned by photolithography for multispectral remote sensing," Proc. SPIE 9241, Sensors, Systems, and Next-Generation Satellites XVIII, 92411K (Oct. 7, 2014); https://doi.org/10.1117/12. 2069596 (Year: 2014).*

(Continued)

*Primary Examiner* — Balram T Parbadia
*Assistant Examiner* — Alex Park Rickel
(74) *Attorney, Agent, or Firm* — Wenderoth, Lind & Ponack, L.L.P.

(57) ABSTRACT

A filter array includes filters disposed in a two-dimensional plane and having different transmission spectra. The filters include a first filter with a transmission spectrum having a first peak group including first and second peaks adjacent to each other, and at least one second filter with a transmission spectrum having a second peak group including third and fourth peaks adjacent to each other. Of peaks included in the second peak group, the third peak has a wavelength closest to a wavelength at the first peak. A first interval between the wavelength at the first peak and a wavelength at the second peak is different from a second interval between the wavelength at the third peak and a wavelength at the fourth peak. $\Delta FSR/\sigma \geq 0.25$, where $\Delta FSR$ denotes an absolute value of a difference between the first and second intervals and $\sigma$ denotes a half-width of the first peak.

7 Claims, 21 Drawing Sheets

(56) References Cited

U.S. PATENT DOCUMENTS

| | | | |
|---|---|---|---|
| 2017/0205337 A1 | 7/2017 | Akhtman et al. | |
| 2019/0056269 A1* | 2/2019 | Liu | G01J 3/28 |
| 2020/0241262 A1* | 7/2020 | Bodkin | G02B 5/281 |
| 2021/0288087 A1 | 9/2021 | Tisserand et al. | |
| 2021/0293622 A1* | 9/2021 | Klimek | G01J 3/0213 |

FOREIGN PATENT DOCUMENTS

| | | |
|---|---|---|
| JP | 2014-178338 | 9/2014 |
| JP | 2014-232164 | 12/2014 |
| JP | 2017-040491 | 2/2017 |
| JP | 2017-526910 | 9/2017 |
| WO | 2017/147514 | 8/2017 |

OTHER PUBLICATIONS

Fabry-Perot Optical Filter. In: Li, D. (eds), 2008, Encyclopedia of Microfluidics and Nanofluidics. Springer, Boston, MA. p. 662-663 https://doi.org/10.1007/978-0-387-48998-8_522 (Year: 2008).*
International Search Report of PCT application No. PCT/JP2021/015828 dated Jun. 29, 2021.
Extended European Search Report issued Oct. 11, 2023 in corresponding European Patent Application No. 21808629.6.

* cited by examiner

FILTER ARRAY AND LIGHT DETECTION SYSTEM

BACKGROUND

1. Technical Field

The present disclosure relates to filter arrays and light detection systems.

2. Description of the Related Art

By utilizing spectral information about a large number of bands, such as several tens of bands, each being a narrow band, detailed characteristics of a target object can be ascertained, which is not possible with a conventional RGB image. A camera that acquires such multi-wavelength information is called a "hyperspectral camera". Hyperspectral cameras are used in various fields, such as in food inspection, biological examination, drug development, and mineral component analysis.

U.S. Pat. No. 9,599,511 discloses an example of a hyperspectral imaging device that utilizes compressed sensing. This imaging device includes an encoder as an array of optical filters with different wavelength dependency with respect to light transmittance, an image sensor that detects light transmitted through the encoder, and a processing circuit. The encoder is disposed on an optical path that connects a subject and the image sensor. For each pixel, the image sensor simultaneously detects light on which components of wavelength bands are superimposed, so as to acquire a single wavelength-multiplexed image. The processing circuit utilizes information about the spatial distribution of spectral transmittance of the encoder so as to apply compressed sensing to the acquired wavelength-multiplexed image, thereby generating image data for each wavelength band. In the imaging device disclosed in U.S. Pat. No. 9,599,511, an optical filter array having at least two transmittance peaks (i.e., maximum values) within a target wavelength range is used as the encoder.

U.S. Pat. No. 9,466,628 discloses an example of a filter array including a Fabry-Perot resonator in which a dielectric multilayer film is used as a reflective layer.

SUMMARY

One non-limiting and exemplary embodiment provides a light detection system that can improve the spectral resolution of a hyperspectral camera, and a filter array used in the light detection system.

In one general aspect, the techniques disclosed here feature a filter array including filters that are disposed in a two-dimensional plane and that have transmission spectra different from each other. The filters include a first filter that has a transmission spectrum having a first peak group including a first peak and a second peak that are adjacent to each other, and at least one second filter that has a transmission spectrum having a second peak group including a third peak and a fourth peak that are adjacent to each other. Of peaks included in the second peak group, the third peak has a wavelength that is closest to a wavelength at the first peak. A first interval between the wavelength at the first peak and a wavelength at the second peak is different from a second interval between the wavelength at the third peak and a wavelength at the fourth peak. $\Delta FSR/\sigma \geq 0.25$, where $\Delta FSR$ denotes an absolute value of a difference between the first interval and the second interval and $\sigma$ denotes a half-width of the first peak.

According to the technology of the present disclosure, the spectral resolution of a hyperspectral camera can be improved.

General or specific aspects of the present disclosure may be implemented as a system, a device, a method, an integrated circuit, a computer program, or a storage medium, such as a computer-readable storage disk, or may be implemented as a freely-chosen combination of a system, a device, a method, an integrated circuit, a computer program, and a storage medium. The computer-readable storage medium may include a nonvolatile storage medium, such as a CD-ROM (compact disc-read only memory). The device may be constituted of one or more devices. If the device is constituted of two or more devices, the two or more devices may be disposed within a single apparatus, or may be disposed separately within two or more separate apparatuses. In this description and the claims, the term "device" may refer not only to a single device but also to a system formed of devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a cross-sectional view schematically illustrating a light detection device according to an exemplary embodiment;

FIG. 14C schematically illustrates a third modification of the light detection device;

FIG. 14E schematically illustrates a fifth modification of the light detection device; and FIG. 14F schematically illustrates a sixth modification of the light detection device.

DETAILED DESCRIPTIONS

Figure 1A:
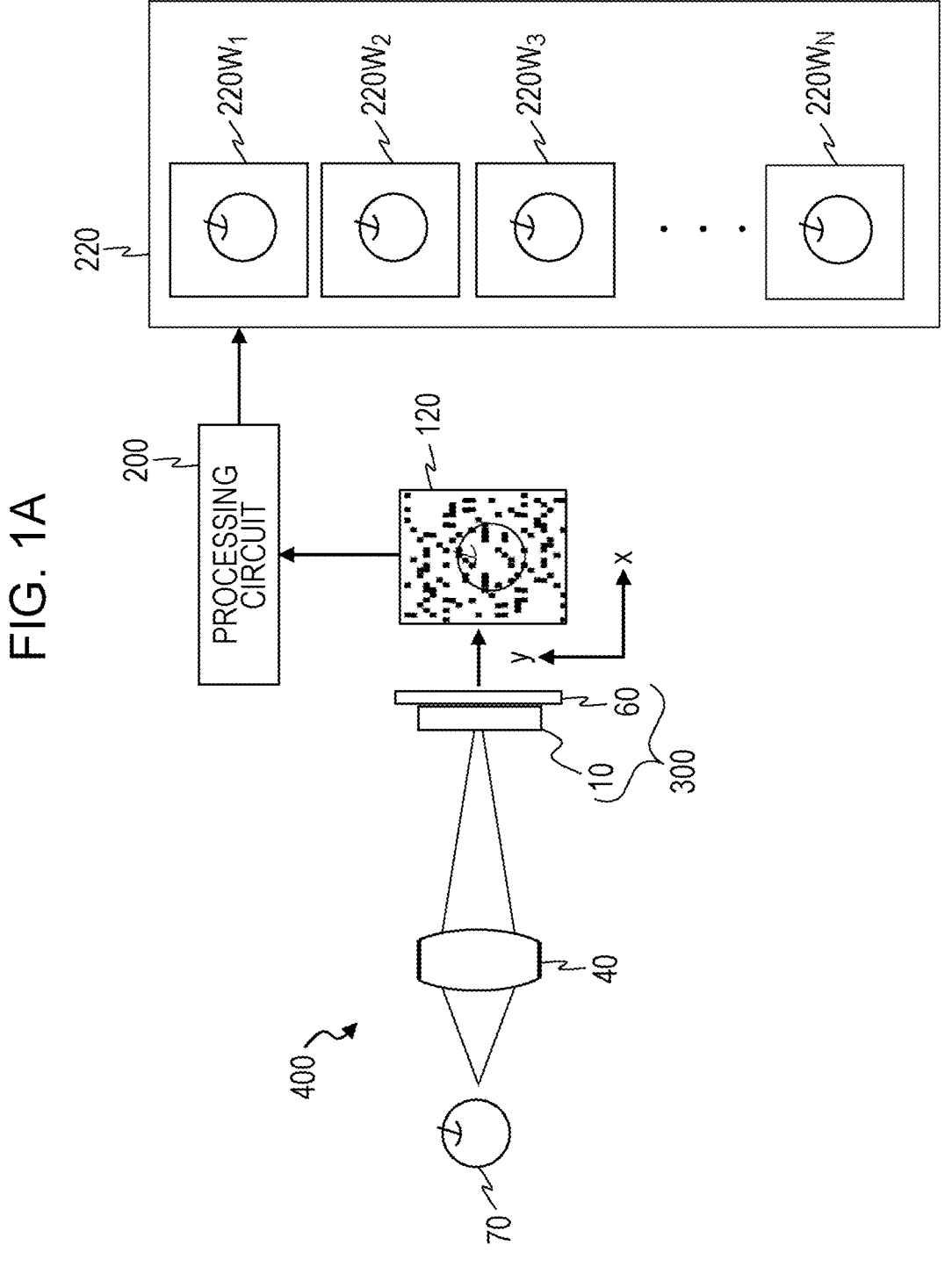
FIG. 1A schematically illustrates a light detection system according to an exemplary embodiment.

Exemplary embodiments of the present disclosure will be described below. The embodiments to be described below indicate general or specific examples. Numerical values, shapes, components, positions and connection methods of the components, steps, and the sequence of the steps are examples and are not intended to limit the scope of the present disclosure. Of the components in the following embodiments, a component not defined in the independent claim indicating the most generic concept is described as a freely-chosen component. Furthermore, the drawings are not necessarily exact illustrations. In each drawing, same reference signs are given to substantially identical components, and redundant descriptions may sometimes be omitted or simplified.

Before describing the embodiments of the present disclosure, the underlying knowledge forming the basis of the present disclosure will be described.

U.S. Pat. No. 9,599,511 discloses an imaging device capable of generating high-resolution multi-wavelength images, that is, images with respect to individual wavelength bands. In this imaging device, an image of light from a target object is encoded by an optical element called an "encoder" and is captured. The encoder has, for example, two-dimensionally-arranged regions. A transmission spectrum of each of at least two of the regions has a maximum transmittance value in each of wavelength ranges within a wavelength range serving as an imaging target. For example, the regions may respectively be disposed in correspondence with pixels of an image sensor. In an imaging process using the aforementioned encoder, data of each pixel contains information about the wavelength ranges. In other words, image data acquired in the imaging process is data containing compressed wavelength information. Therefore, the amount of data can be minimized by simply retaining two-dimensional data. For example, even in a case where a storage medium is limited in capacity, long-duration moving-image data can be acquired. The multi-wavelength images are generated by performing a reconstruction process involving reconstructing the image captured in the imaging process. The multi-wavelength images correspond one-to-one to the wavelength ranges. In the following description, each of the images generated and corresponding one-to-one to the wavelength ranges, that is, wavelength bands, may also be referred to as "spectral image".

The encoder may be realized by, for example, a filter array including two-dimensionally-arranged filters. For example, each filter may have the structure of a so-called Fabry-Perot resonator that includes an interference layer. As a Fabry-Perot resonator, for example, the structure disclosed in U.S. Pat. No. 9,466,628 may be employed. The filters may be designed such that the transmission spectrum of each filter has peaks in the wavelength range serving as the imaging target. The peaks shift toward the shorter wavelength side when the interference layer is reduced in thickness, whereas the peaks shift toward the longer wavelength side when the interference layer is increased in thickness. The filters having the interference layers with different thicknesses have different transmission spectra.

An interval between neighboring peaks in a transmission spectrum is referred to as an FSR (free spectral range). According to the study of the present inventors, it is discovered that a spectral image with respect to a certain wavelength range may sometimes be inaccurate when a multi-wavelength image is generated by using a filter array in which the filters all have the same FSR. In that case, the spectral resolution of a hyperspectral camera deteriorates.

A filter array according to an embodiment of the present disclosure is designed such that at least two of the filters have different FSRs. Such a filter array reduces the possibility in which an inaccurate spectral image is generated. As a result, the spectral resolution of a hyperspectral camera can be improved. A filter array according to an embodiment of the present disclosure and a light detection system according to the present disclosure equipped with the filter array will be briefly described below.

First Item

A filter array according to a first item of the present disclosure includes filters that are disposed in a two-dimensional plane and that have transmission spectra different from each other. The filters include a first filter that has a transmission spectrum having a first peak group including a first peak and a second peak that are adjacent to each other, and at least one second filter that has a transmission spectrum having a second peak group including a third peak and a fourth peak that are adjacent to each other. Of peaks included in the second peak group, the third peak has a wavelength that is closest to a wavelength at the first peak. A first interval between the wavelength at the first peak and a wavelength at the second peak is different from a second interval between the wavelength at the third peak and a wavelength at the fourth peak. $\Delta FSR/\sigma \geq 0.25$, where $\Delta FSR$ denotes an absolute value of a difference between the first interval and the second interval and σ denotes a half-width of the first peak.

In this filter array, a spectral image can be generated in a reconstruction process more accurately in a target wavelength range W that is wider than a first interval $FSR_1$ and a second interval $FSR_2$. As a result, the spectral resolution of a hyperspectral camera can be improved.

Second Item

In the filter array according to the first item, the at least one second filter may include second filters, and the number of the second filters may be greater than or equal to 10% of the total number of the filters.

This filter array increases the possibility in which a spectral image can be generated in a reconstruction process more accurately in the target wavelength range W that is wider than the first interval $FSR_1$ and the second interval $FSR_2$.

Third Item

In the filter array according to the first or second item, the first filter may include a first interference layer having a first reflective surface and a second reflective surface opposite the first reflective surface, and the first peak and the second peak may be obtained as a result of a standing wave being formed within the first interference layer.

In this filter array, the first filter can be designed such that the transmission spectrum has peaks including the first peak and the second peak.

Fourth Item

In the filter array according to the first or second item, the second filter may include a second interference layer having a third reflective surface and a fourth reflective surface opposite the third reflective surface, and the third peak and the fourth peak may be obtained as a result of a standing wave being formed within the second interference layer.

In this filter array, the second filter can be designed such that the transmission spectrum has peaks including the third peak and the fourth peak.

Fifth Item

A light detection system according to a fifth item of the present disclosure includes the filter array according to any one of the first to fourth items and an image sensor that is disposed at a position where the image sensor receives light transmitted through the filters.

In this light detection system, a hyperspectral camera with improved spectral resolution can be realized.

Sixth Item

The light detection system according to the fifth item of the present disclosure may further include a processing circuit that generates spectral image data corresponding to each of wavelength bands based on data indicating a spatial distribution of the transmission spectra of the filters and image data acquired by the image sensor.

In the present disclosure, each circuit, unit, device, member, or section or each functional block in each block diagram may entirely or partially be implemented by, for example, one or more electronic circuits containing a semiconductor device, semiconductor IC (integrated circuit), or LSI (large scale integration). The LSI or the IC may be integrated in a single chip or may be configured by combining chips. For example, the functional blocks excluding storage elements may be integrated in a single chip. Although the terms "LSI" and "IC" are used here, the terms used may change depending on the degree of integration, such that so-called "system LSI", "VLSI" (very large scale integration), or "ULSI" (ultra large scale integration) may be used. A field programmable gate array (FPGA) to be programmed after the LSI is manufactured, or a reconfigurable logic device that can reconfigure the connection relationship inside the LSI or can set up the circuit sections inside the LSI can also be used for the same purpose.

Furthermore, the function or operation of each circuit, unit, device, member, or section may entirely or partially be implemented by software processing. In this case, the software is stored in a non-transitory storage medium, such as one or more ROM (read-only memory) units, an optical disk, or a hard disk drive. When the software is executed by a processor, a function specified by the software is implemented by the processor and a peripheral device. A system or a device may include one or more non-transitory storage media storing the software, a processor, and a required hardware device, such as an interface.

EMBODIMENTS

Light Detection System

FIG. 1A schematically illustrates a light detection system 400 according to an exemplary embodiment of the present disclosure. The light detection system 400 includes an optical unit 40, a filter array 10, an image sensor 60, and a processing circuit 200. The filter array 10 has a function similar to that of the "encoder" disclosed in U.S. Pat. No. 9,599,511. Therefore, the filter array 10 may also be referred to as an "encoder". The optical unit 40 and the filter array 10 are disposed on an optical path of light incident from a target object 70. In the example illustrated in FIG. 1A, the filter array 10 is disposed between the optical unit 40 and the image sensor 60.

In FIG. 1A, an apple is illustrated as an example of the target object 70. The target object 70 is not limited to an apple and may be a freely-chosen object. Based on image data generated by the image sensor 60, the processing circuit 200 generates image data with respect to each of wavelength bands included in a specific wavelength range serving as a target wavelength range. This image data will be referred to as "spectral image data" in this description. The number of wavelength bands included in the target wavelength range will be defined as N (N being an integer greater than or equal to 4). In the following description, the spectral image data to be generated with respect to the wavelength bands will be referred to as spectral images $220W_1$, $220W_2$, . . . , and $220W_N$, and these spectral images will collectively be referred to as spectral images 220. In this description, a signal indicating an image, that is, a group of signals indicating pixel values of pixels constituting an image, may sometimes be simply referred to as "image".

The filter array 10 includes translucent filters arranged in rows and columns. The filter array 10 is an optical element in which the light transmission spectrum, that is, wavelength dependency with respect to light transmittance, varies from filter to filter. The filter array 10 modulates the intensity of incident light for each wavelength range and allows the incident light to pass through.

In the example illustrated in FIG. 1A, the filter array 10 is disposed close to or directly on the image sensor 60. The expression "close to" implies that the filter array 10 is close to the image sensor 60 to an extent that an image of light from the optical unit 40 is formed on a surface of the filter array 10 in a state where the image is clear to a certain extent. The expression "directly on" implies that the two are close to each other with hardly any gap therebetween. The filter array 10 and the image sensor 60 may be integrated with each other. In this description, a device that includes the filter array 10 and the image sensor 60 will be referred to as "light detection device 300".

The optical unit 40 includes at least one lens. Although illustrated as a single lens in FIG. 1A, the optical unit 40 may be constituted of a combination of lenses. The optical unit 40 forms an image on an imaging surface of the image sensor 60 via the filter array 10.

Figure 1B:
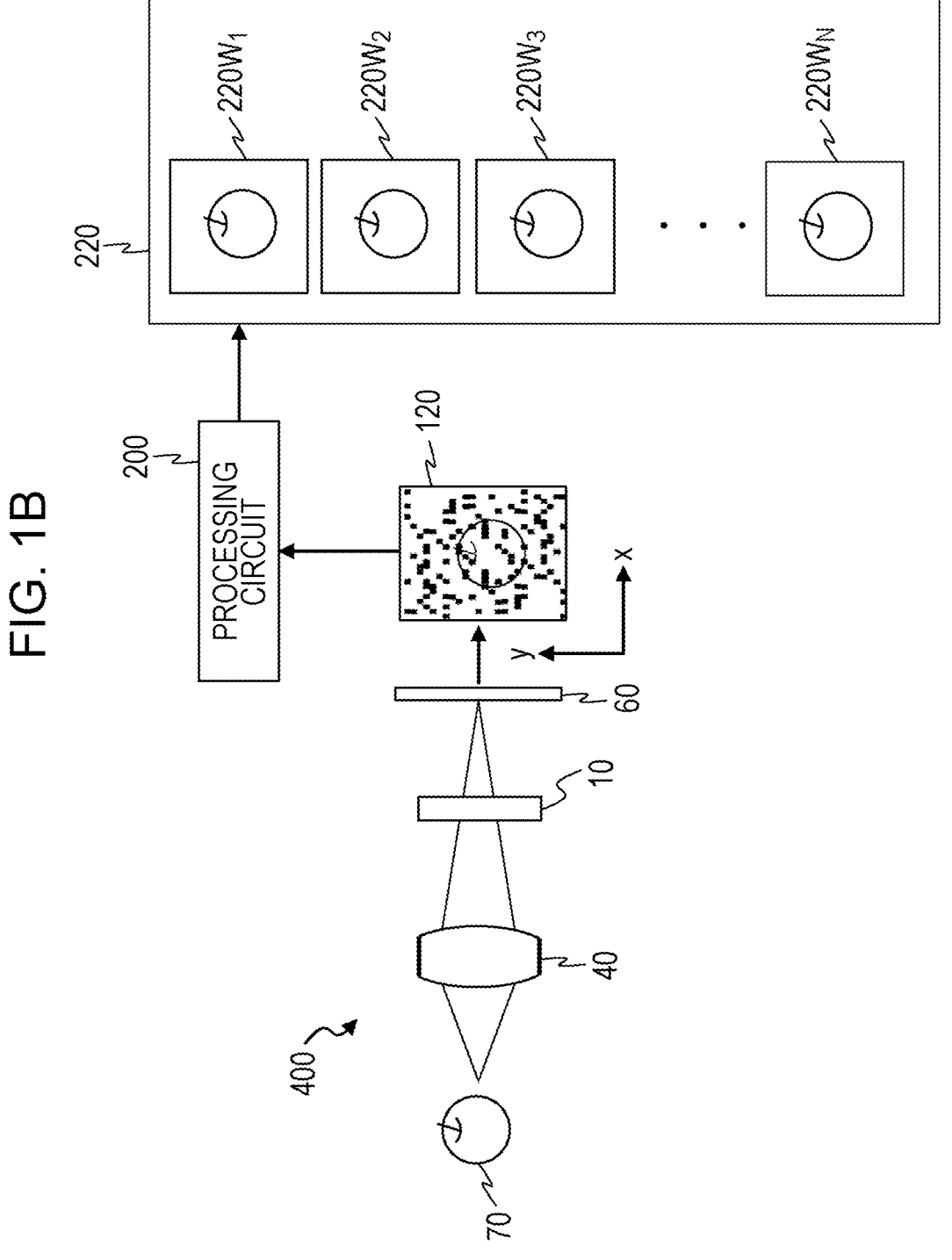
FIG. 1B illustrates a configuration example of the light detection system in which a filter array is disposed away from an image sensor.
Figure 1C:
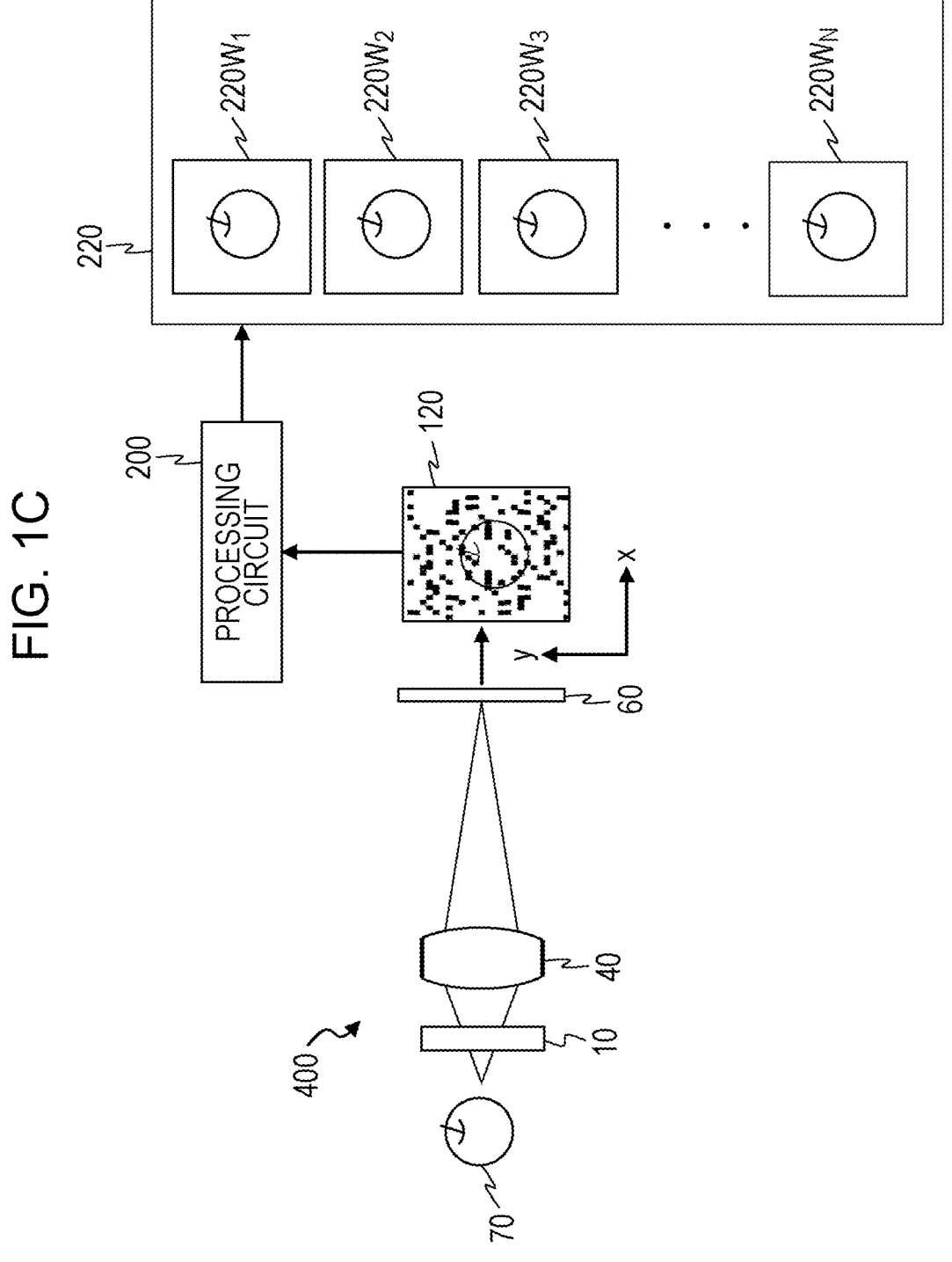
FIG. 1C illustrates a configuration example of the light detection system in which the filter array is disposed away from the image sensor.
Figure 1D:
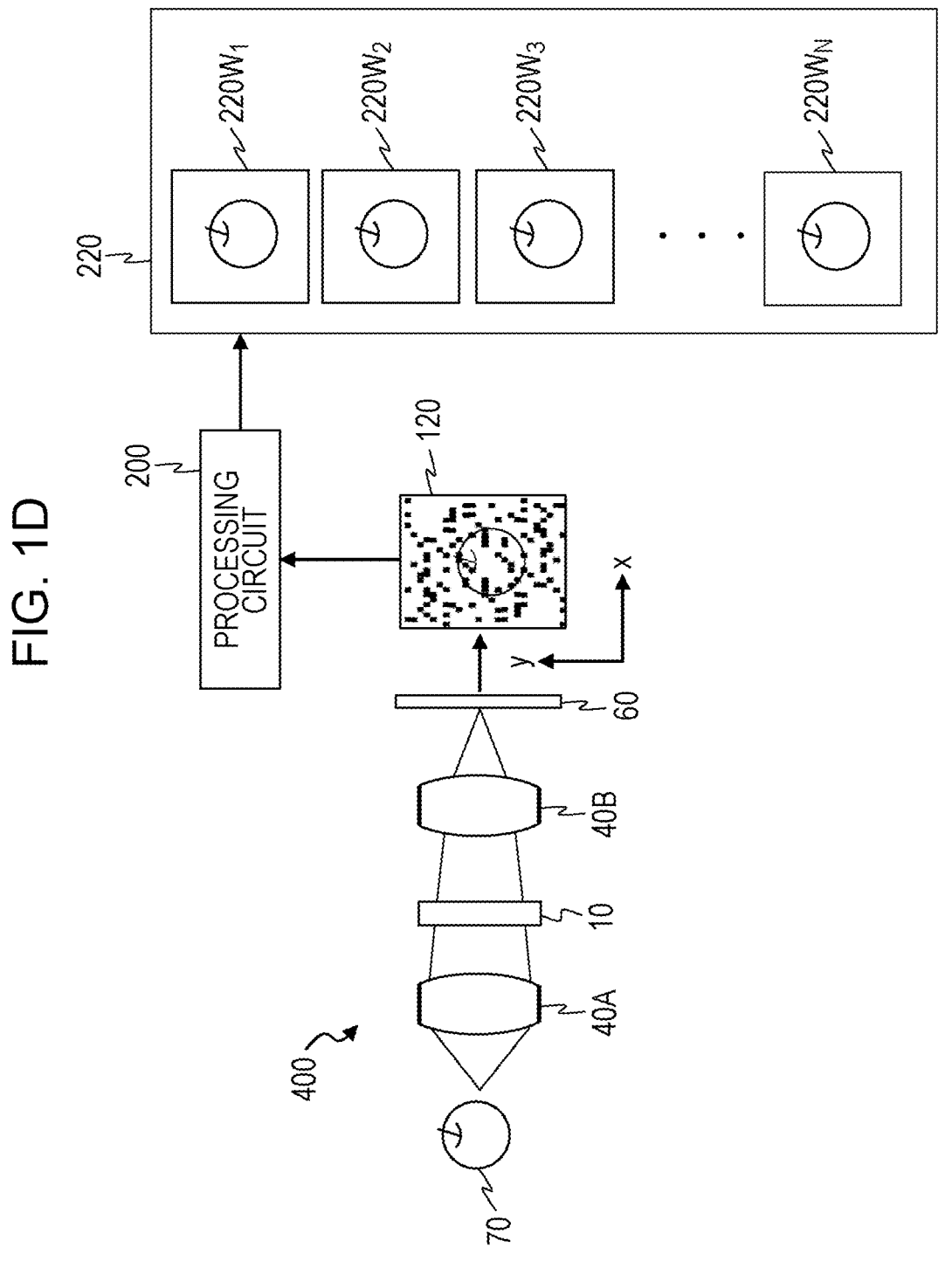
FIG. 1D illustrates a configuration example of the light detection system in which the filter array is disposed away from the image sensor.

The filter array 10 may be disposed away from the image sensor 60. FIGS. 1B to 1D each illustrate a configuration example of the light detection system 400 in which the filter array 10 is disposed away from the image sensor 60. In the example in FIG. 1B, the filter array 10 is disposed at a position located between the optical unit 40 and the image sensor 60 and away from the image sensor 60. In the example in FIG. 1C, the filter array 10 is disposed between the target object 70 and the optical unit 40. In the example in FIG. 1D, the light detection system 400 includes two optical units 40A and 40B, and the filter array 10 is disposed therebetween. As in these examples, an optical unit including at least one lens may be disposed between the filter array 10 and the image sensor 60.

The image sensor 60 includes two-dimensionally-arranged light detection elements. The image sensor 60 may be, for example, a CCD (charge-coupled device) sensor, a CMOS (complementary metal oxide semiconductor) sensor, or an infrared array sensor. The light detection elements may include, for example, photodiodes. The image sensor 60 may be, for example, a monochrome-type sensor or a color-type sensor. The target wavelength range may be set arbitrarily. The target wavelength range is not limited to a visible wavelength range, and may be an ultraviolet, near-infrared, mid-infrared, far-infrared, or microwave wavelength range.

In the example illustrated in FIG. 1A, each light detection element is disposed facing one of the filters. Each light detection element has sensitivity to light in the wavelength range serving as the imaging target. In detail, each light detection element has substantial sensitivity required for detecting light in the wavelength range serving as the imaging target. For example, the external quantum efficiency of each light detection element in the aforementioned wavelength range may be higher than or equal to 1%. The external quantum efficiency of each light detection element may be higher than or equal to 10%. The external quantum efficiency of each light detection element may be higher than or equal to 20%. In the following description, each light detection element may also be referred to as "pixel".

The processing circuit 200 may be, for example, an integrated circuit that includes a processor and a storage medium, such as a memory. Based on an image 120 acquired by the image sensor 60, the processing circuit 200 generates data of the spectral images 220 respectively containing information about the wavelength bands. The spectral images 220, as well as a method for processing an image signal in the processing circuit 200, will be described in detail later. The processing circuit 200 may be incorporated in the light detection device 300, or may be a component of a signal processing device electrically connected to the light detection device 300 in a wired or wireless manner.

Filter Array

The filter array 10 according to this embodiment will be described below. The filter array 10 is disposed on the optical path of light incident from a target object and modulates the intensity of the incident light for each wavelength before outputting the light. This process performed by a filter array, that is, an encoder, is referred to as "encoding" in this description.

Figure 2A:
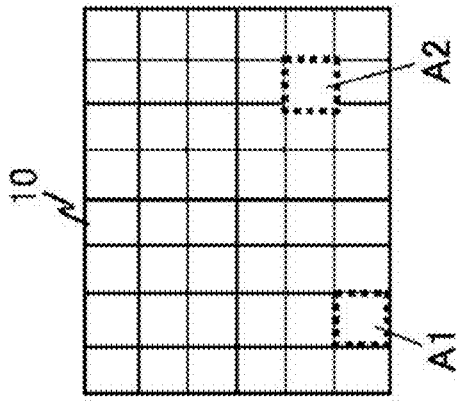
FIG. 2A schematically illustrates an example of a filter array according to an exemplary embodiment.

FIG. 2A schematically illustrates an example of the filter array 10. The filter array 10 includes two-dimensionally-arranged filters. Each filter has an individually-set transmission spectrum. The transmission spectrum is expressed as a function $T(\lambda)$, where $\lambda$ denotes the wavelength of incident light. The transmission spectrum $T(\lambda)$ may have a value greater than or equal to 0 and less than or equal to 1.

In the example illustrated in FIG. 2A, the filter array 10 has 48 rectangular filters arranged in a 6 row by 8 column matrix. This is merely an example, and a larger number of filters may be set in actual application. For example, the number may be about the same as the number of pixels in the image sensor 60. The number of filters included in the filter array 10 is set in accordance with the intended usage within a range of, for example, several tens to several thousands of filters.

Figure 2B:
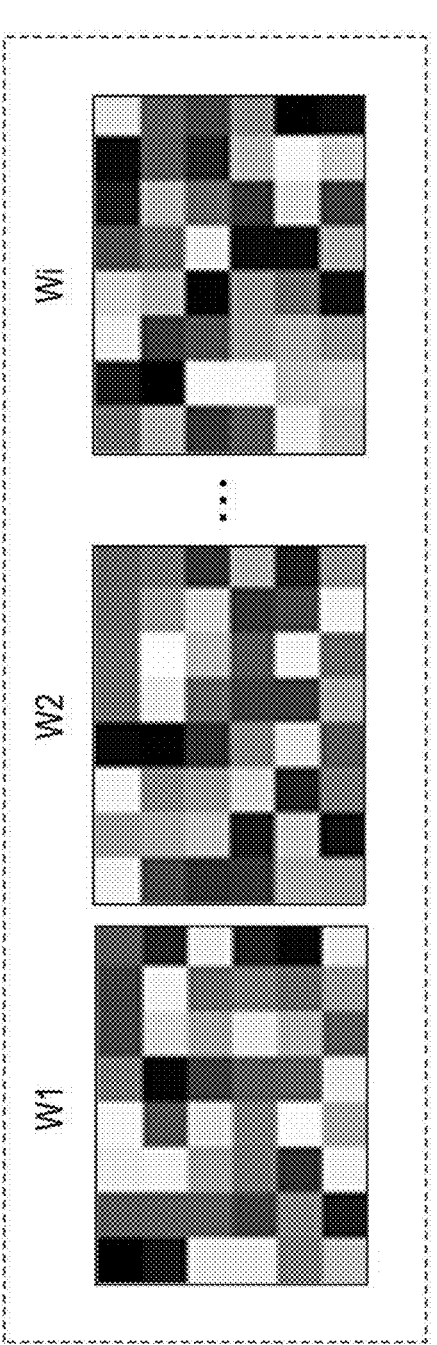
FIG. 2B illustrates an example of a spatial distribution of light transmittance in each of wavelength ranges included in a target wavelength range.

FIG. 2B illustrates an example of a spatial distribution of light transmittance for each of wavelength ranges W1, W2, . . . , and Wi included in the target wavelength range. In the example illustrated in FIG. 2B, the differences in the gradation levels of the filters indicate differences in transmittance. A paler filter has higher transmittance, whereas a darker filter has lower transmittance. As illustrated in FIG. 2B, the spatial distribution of light transmittance varies from wavelength range to wavelength range.

Figure 2C:
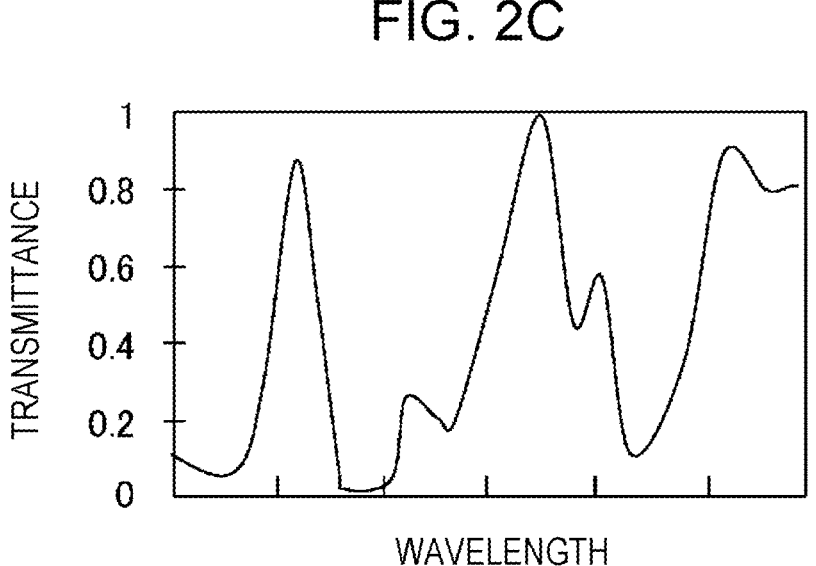
FIG. 2C illustrates an example of a transmission spectrum of a certain filter included in the filter array illustrated in FIG. 2A.
Figure 2D:
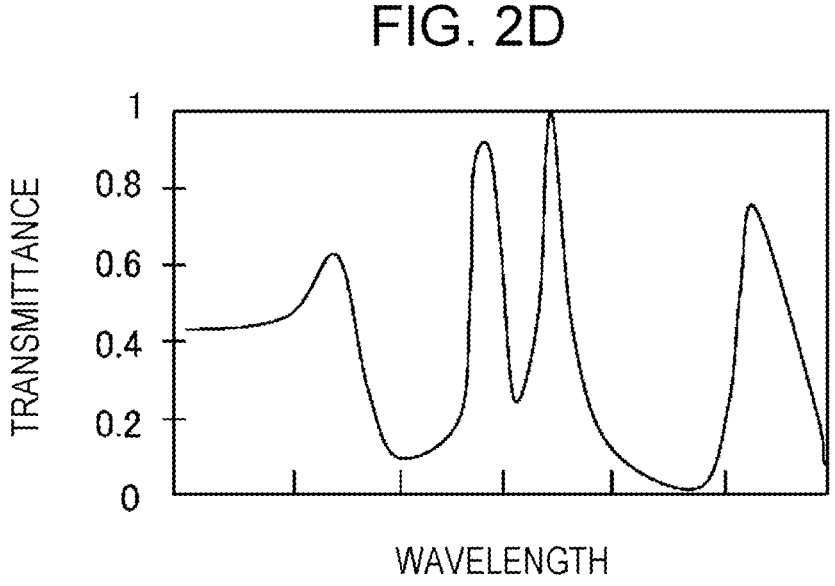
FIG. 2D illustrates an example of a transmission spectrum of another filter included in the filter array illustrated in FIG. 2A.

FIGS. 2C and 2D illustrate examples of transmission spectra of a filter A1 and a filter A2 included in the filters of the filter array 10 in FIG. 2A. The transmission spectrum of the filter A1 and the transmission spectrum of the filter A2 are different from each other. Accordingly, the transmission spectrum of the filter array 10 varies from filter to filter. However, not all the filters need to have different transmission spectra. In the filter array 10, at least two of the filters have transmission spectra different from each other. In other words, the filter array 10 includes two or more filters with different transmission spectra. In one example, the number of transmission spectrum patterns of the filters included in the filter array 10 may be equal to or greater than the number i of wavelength ranges included in the target wavelength range. The filter array 10 may be designed such that at least half of the filters have different transmission spectra.

Figure 3A:
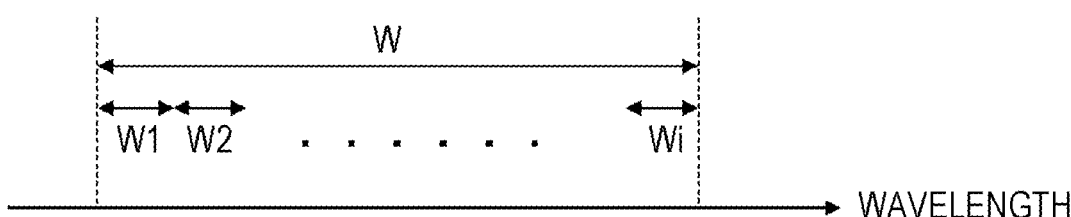
FIG. 3A is a diagram for explaining an example of the relationship between the target wavelength range and wavelength ranges included therein.
Figure 3B:
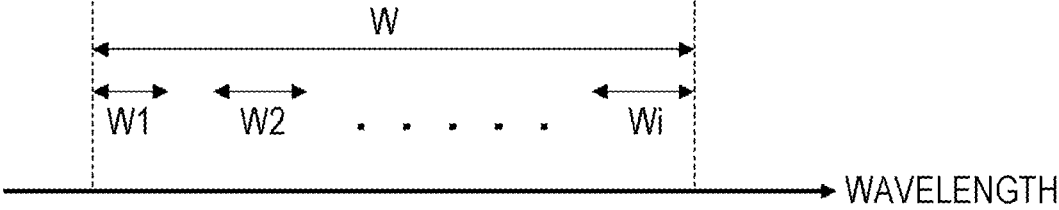
FIG. 3B is a diagram for explaining another example of the relationship between the target wavelength range and the wavelength ranges included therein.

FIGS. 3A and 3B are diagrams for explaining the relationship between a target wavelength range W and the wavelength ranges W1, W2, . . . , and Wi included therein. The target wavelength range W may be set to any of various ranges in accordance with the intended usage. For example, the target wavelength range W may be a visible-light wavelength range from approximately 400 nm to approximately 700 nm, a near-infrared wavelength range from approximately 700 nm to approximately 2500 nm, or a near-ultraviolet wavelength range from approximately 10 nm to approximately 400 nm. Alternatively, the target wavelength range W may be a radio-wave range, such as a mid-infrared, far-infrared, terahertz-wave, or millimeter-wave range. Accordingly, the wavelength range to be used is not limited to a visible-light range. In this description, nonvisible light, such as a near-ultraviolet ray, a near-infrared ray, and a radio wave, in addition to visible light will be referred to as "light" for the sake of convenience.

In the example illustrated in FIG. 3A, the target wavelength range W is equally divided by i into a wavelength range W1, a wavelength range W2, . . . , and a wavelength range Wi, where i denotes a freely-chosen integer greater than or equal to 4. However, the example is not limited to this. The wavelength ranges included in the target wavelength range W may be set arbitrarily. For example, the bandwidths may be nonuniform among the wavelength ranges. There may be a gap between neighboring wavelength ranges. In the example illustrated in FIG. 3B, the bandwidth varies from wavelength range to wavelength range, and a gap exists between two neighboring wavelength ranges. Accordingly, the wavelength ranges may be different from each other, and may be set arbitrarily. The division number i for the wavelengths may be less than or equal to 3.

Figure 4A:
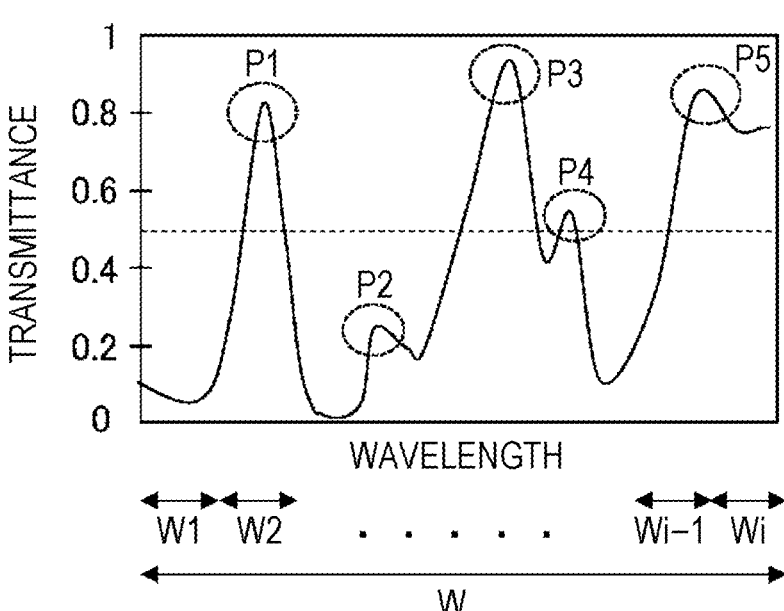
FIG. 4A is a diagram for explaining the characteristic of a transmission spectrum of a certain filter in the filter array.

FIG. 4A is a diagram for explaining the characteristic of a transmission spectrum of a certain filter in the filter array 10. In the example illustrated in FIG. 4A, the transmission spectrum has a maximum value P1 to a maximum value P5 and minimum values with respect to wavelengths within the target wavelength range W. In the example illustrated in FIG. 4A, the light transmittance within the target wavelength range W is normalized such that the maximum value thereof is 1 and the minimum value thereof is 0. In the example illustrated in FIG. 4A, the transmission spectrum has maximum values in wavelength ranges, such as the wavelength range W2 and a wavelength range Wi–1. Accordingly, in this embodiment, the transmission spectrum of each filter has maximum values in at least two wavelength ranges from the wavelength range W1 to the wavelength range Wi. It is apparent from FIG. 4A that the maximum value P1, the maximum value P3, the maximum value P4, and the maximum value P5 are greater than or equal to 0.5.

Accordingly, the light transmittance of each filter varies from wavelength to wavelength. Therefore, the filter array 10 transmits a large amount of incident light in certain wavelength ranges and does not transmit much of the incident light in other wavelength ranges. For example, the transmittance with respect to light in k wavelength ranges among i wavelength ranges may be higher than 0.5, whereas the transmittance with respect to light in the remaining (i–k) wavelength ranges may be lower than 0.5. In this case, k denotes an integer satisfying the relationship $2 \leq k < i$. Supposing that the incident light is white light uniformly containing all wavelength components of visible light, the filter array 10 modulates the incident light into light having discrete intensity peaks with respect to the wavelengths for each filter, superimposes the multi-wavelength light, and outputs the light.

Figure 4B:
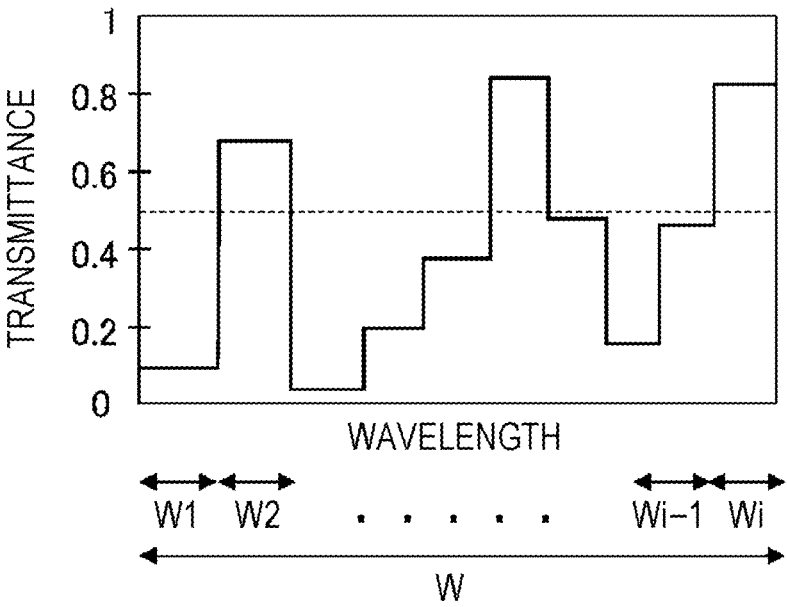
FIG. 4B illustrates a result obtained by averaging the transmission spectrum illustrated in FIG. 4A for each wavelength range.

FIG. 4B illustrates an example of a result obtained by averaging the transmission spectrum illustrated in FIG. 4A for each of the wavelength range W1, the wavelength range W2, . . . , and the wavelength range Wi. Averaged transmittance is obtained by integrating the transmission spectrum $T(\lambda)$ for each wavelength range and dividing the integral value by the bandwidth of the wavelength range. In this description, a transmittance value averaged for each wavelength range in this manner will be referred to as transmittance in that wavelength range. In this example, transmittance is outstandingly high in the three wavelength ranges having the maximum value P1, the maximum value P3, and the maximum value P5. In particular, the transmittance exceeds 0.8 in the two wavelength ranges having the maximum value P3 and the maximum value P5.

The resolution in the wavelength direction of the transmission spectrum of each filter may be set to about the bandwidth of a desired wavelength range. In other words, in a wavelength range including one maximum value in a transmission spectrum curve, the width of a range having a value greater than or equal to an average value between a minimum value closest to the maximum value and the maximum value may be set to about the bandwidth of the desired wavelength range. In this case, the transmission spectrum may be decomposed into frequency components by, for example, a Fourier transform, so that the value of a frequency component corresponding to the wavelength range relatively increases.

As illustrated in FIG. 2A, the filter array 10 typically has filters segmented into a grid-like pattern. These filters partially or entirely have transmission spectra different from each other. The light-transmittance wavelength distribution and spatial distribution of the filters included in the filter array 10 may be, for example, a random distribution or a semi-random distribution.

The concepts of a random distribution and a semi-random distribution are as follows. First, each filter in the filter array 10 may be regarded as, for example, a vector component having a value of 0 to 1 in accordance with the light transmittance. In a case where the transmittance is 0, the value of the vector component is 0. In a case where the transmittance is 1, the value of the vector component is 1. In other words, a group of filters arranged in a single line in the row direction or the column direction may be regarded as a multidimensional vector having a value from 0 to 1. Therefore, it may be regarded that the filter array 10 includes multidimensional vectors in the row direction or the column direction. In this case, a random distribution means that two freely-chosen multidimensional vectors are independent, that is, not parallel. A semi-random distribution means that the multidimensional vectors partially include a non-independent configuration. Therefore, in a random distribution and a semi-random distribution, a vector having a light transmittance value in a first wavelength range as an element in each filter belonging to a group of filters included in the filters and arranged in one row or column and a vector having a light transmittance value in the first wavelength range as an element in each filter belonging to a group of filters arranged in another row or column are independent from each other. With regard to a second wavelength range different from the first wavelength range, a vector having a light transmittance value in the second wavelength range as an element in each filter belonging to a group of filters included in the filters and arranged in one row or column and a vector having a light transmittance value in the second wavelength range as an element in each filter belonging to a group of filters arranged in another row or column are independent from each other.

In a case where the filter array 10 is disposed close to or directly on the image sensor 60, the spacing between the filters included in the filter array 10 may substantially match the pixel pitch of the image sensor 60. Accordingly, light encoded by a certain filter included in the filter array 10 enters a pixel without being mixed with light encoded by a neighboring filter. Light transmitted through each filter enters only a single corresponding pixel, so that an arithmetic process to be described later can be readily performed. In a case where the filter array 10 is disposed away from the image sensor 60, the pitch of the filters may be set finely in accordance with the distance.

In the examples illustrated in FIGS. 2A to 2D, the filter array 10 has a gray-scale transmittance distribution in which the transmittance of each filter may be a freely-chosen value that is greater than or equal to 0 and less than or equal to 1. However, such a gray-scale transmittance distribution is not necessarily essential. For example, a binary-scale transmittance distribution in which the transmittance of each filter may have a value of either substantially 0 or substantially 1 may be employed. In a binary-scale transmittance distribution, each filter transmits a large portion of light in at least two wavelength ranges of the wavelength ranges included in the target wavelength range, and does not transmit a large portion of light in the remaining wavelength ranges. The expression "large portion" refers to substantially 80% or higher.

Of all the filters, some of them, such as half of the filters, may be replaced with transparent filters. Such transparent filters transmit light in all the wavelength ranges W1 to Wi included in the target wavelength range with about the same high transmittance. For example, the high transmittance is higher than or equal to 0.8. In such a configuration, the transparent filters may be arranged in, for example, a checkboard pattern. In other words, in two arrangement directions of the filters in the filter array 10, filters whose light transmittance varies in accordance with the wavelength and transparent filters may be alternately arranged. In the example illustrated in FIG. 2A, the two arrangement directions are a horizontal direction and a vertical direction.

Such data indicating the spatial distribution of the spectral transmittance of the filter array 10 is preliminarily acquired based on design data or actual measurement calibration, and is stored in a storage medium included in the processing circuit 200. The data is used in an arithmetic process to be described later.

The filter array 10 may be constituted by using, for example, a multilayer film, an organic material, a diffraction grating structure, or a metal-containing micro-structure. In a case where a multilayer film is to be used, for example, a dielectric multilayer film or a multilayer film including a metallic layer may be used. In this case, the filter array 10 may be formed such that at least one of the thickness, the material, and the stacked order of each multilayer film varies for each filter. Accordingly, spectral characteristics that vary from filter to filter can be realized. By using a multilayer film, sharp rising and falling in spectral transmittance can be realized. A configuration that uses an organic material may be realized by varying a contained pigment or dye from filter to filter, or by stacking different types of materials. A configuration that uses a diffraction grating structure may be realized by providing a diffracting structure with a diffraction pitch or depth that varies from filter to filter. In a case where a metal-containing micro-structure is to be used, the filter array 10 may be fabricated by utilizing spectroscopy based on a plasmon effect.

Processing Circuit

Next, a method for generating multi-wavelength spectral images 220 in a reconstruction process by using the processing circuit 200 will be described. The term "multi-wavelength" refers to, for example, wavelength ranges larger in number than the three color wavelength ranges of RGB acquired by a normal color camera. The number of wavelength ranges may be, for example, four to about 100. The number of wavelength ranges may also be referred to as "the number of spectral bands". Depending on the intended usage, the number of spectral bands may exceed 100.

Spectral images 220 to be desirably obtained are expressed as f. Assuming that the number of spectral bands is defined as w, the data f is obtained by integrating image data $f_1$, $f_2$, . . . , and $f_w$ of respective bands. As illustrated in FIG. 1A, the horizontal direction of an image is defined as an x direction, and the vertical direction of an image is defined as a y direction. Assuming that the number of pixels in the x direction of image data to be obtained is defined as n and the number of pixels in the y direction is defined as m, each piece of image data $f_1$, $f_2$, . . . , and $f_w$ is two-dimensional data with n×m pixels. Therefore, the data f is three-dimensional data with n×m×w elements. On the other hand, the number of elements in data g of the image 120 acquired by being encoded and multiplexed by the filter array 10 is n×m. The data g can be expressed using Expression (1) indicated below:

$$g = Hf = H\begin{bmatrix} f_1 \\ f_2 \\ \vdots \\ f_w \end{bmatrix} \tag{1}$$

In this case, $f_1$, $f_2$, . . . , and $f_w$ each denote data having n×m elements. Therefore, a vector at the right-hand side is strictly a one-dimensional vector of n×m×w rows and one column. A vector g is expressed and calculated by being converted into a one-dimensional vector of n×m rows and one column. A matrix H expresses a transform involving encoding and intensity-modulating components $f_1$, $f_2$, . . . , and $f_w$, of a vector f with encoding information that varies for each wavelength range and adding the components together. Therefore, H is a matrix of n×m rows and n×m×w columns.

If the vector g and the matrix H are given, it appears as if f can be calculated by solving an inverse problem of Expression (1). However, since the number of elements n×m×w in the data f to be obtained is greater than the number of elements n×m in the acquisition data g, this problem is an ill-posed problem and cannot be solved as is. The processing circuit 200 utilizes the redundancy of the image included in the data f to obtain a solution by using a compressed sensing technique. In detail, the data f to be obtained is estimated by solving Expression (2) indicated below:

$$f' = \arg\min_f \{\|g - Hf\|_{l_2} + \tau\phi(f)\} \tag{2}$$

In this case, f' denotes estimated data off. The first term in the parentheses in the above expression indicates an amount of deviation, that is, a so-called residual term, between an estimation result Hf and the acquisition data g. Although a square sum is set as the residual term here, an absolute value or a root-sum-square value may be set as the residual term. The second term in the parentheses is a regularization term or a stabilization term to be described later. Expression (2) involves determining f that minimizes the sum of the first term and the second term. The processing circuit 200 can converge on solution in accordance with a recursive iterative operation so as to ultimately calculate a solution f.

The first term within the parentheses in Expression (2) indicates an arithmetic process involving determining a square sum of a difference between the acquisition data g and Hf obtained by performing a system conversion on fin the estimation process using the matrix H. In the second term, $\Phi(f)$ denotes a limiting condition in the regularization of f, and is a function having sparse information of the estimation data reflected therein. With regard to the function, there is an advantage of making the estimation data smooth or stable. The regularization term may be expressed by, for example, a discrete cosine transform (DCT) of f, a wavelet transform, a Fourier transform, or a total variation (TV). For example, if a total variation is used, stable estimation data in which the effect of noise in the observation data g is reduced can be acquired. The sparse characteristics of the target object 70 in the space of each regularization term vary depending on the texture of the target object 70. A regularization term in which the texture of the target object 70 becomes sparser in the space of the regularization term may be selected. Alternatively, regularization terms may be included in the arithmetic process. τ denotes a weighting factor. The larger the weighting factor τ, the amount of cutback of redundant data increases, thus increasing the percentage to be compressed. The smaller the weighting factor τ, the weaker the convergence to the solution. The weighting factor τ is set to an appropriate value at which f converges to a certain extent and that does not lead to over-compression.

In the configurations in FIGS. 1B to 1D, an image encoded by the filter array 10 is acquired in a blurry state on the imaging surface of the image sensor 60. Therefore, by preliminarily storing this blurriness information and reflecting this blurriness information on the aforementioned system matrix H, spectral images 220 can be generated in a reconstruction process. The blurriness information can be expressed by a point spread function (PSF). A PSF is a function that defines the degree of spreading of a point image toward surrounding pixels. For example, if a point image corresponding to one pixel in an image spreads to a k×k pixel region surrounding the pixel due to blurriness, the PSF may be defined as a coefficient group, that is, a matrix, indicating an effect on the brightness of the pixels within the region. By reflecting the effect of blurriness of the encoding pattern by the PSF on the system matrix H, spectral images 220 can be generated in a reconstruction process. Although the filter array 10 may be disposed at a freely-chosen position, a position where the encoding pattern of the filter array 10 does not spread too much and disappear may be selected.

Although an arithmetic example using compressed sensing indicated in Expression (2) is described here, a solution may be obtained by using another method. For example, another statistical method, such as a maximum likelihood estimation method or a Bayes estimation method, may be used. Furthermore, the number of spectral images 220 is arbitrary, and the wavelength ranges may also be set arbitrarily. The reconstruction method is disclosed in detail in U.S. Pat. No. 9,599,511. The entire disclosure contents of U.S. Pat. No. 9,599,511 are incorporated in this description.

Filter Array Equipped with Fabry-Perot Filters

Figure 5:
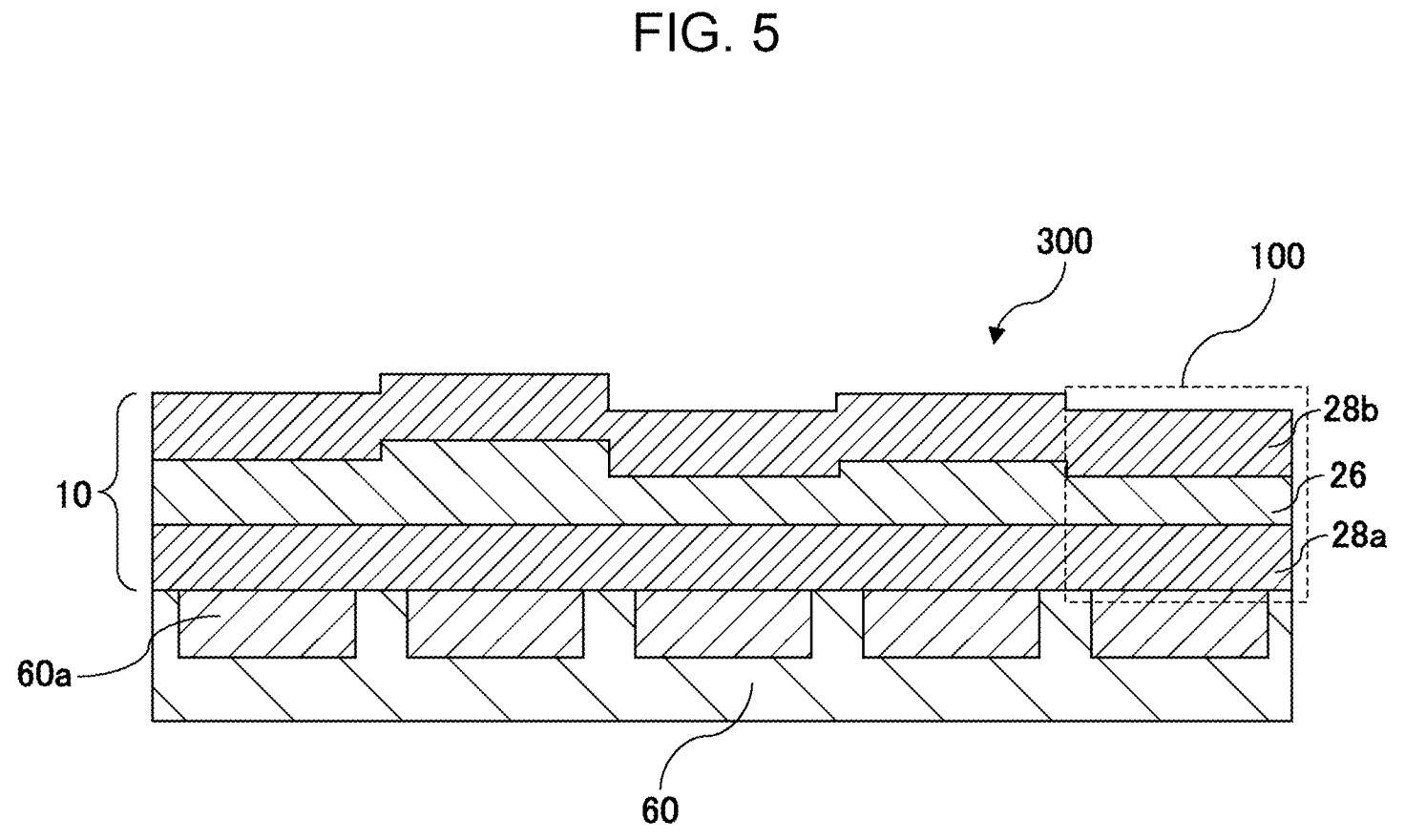

Next, an example of a specific structure of the filter array 10 according to this embodiment will be described with reference to FIG. 5. FIG. 5 is a cross-sectional view schematically illustrating an example of the light detection device 300. The cross-sectional view illustrates an example of a cross-sectional structure of one of the rows of the filter array 10 illustrated in FIG. 2A and the image sensor 60. In the example illustrated in FIG. 5, the filter array 10 is disposed on the image sensor 60. Light detection elements 60a included in the image sensor 60 are respectively positioned directly below corresponding filters 100 of filters 100 included in the filter array 10. The filter array 10 and the image sensor 60 may be separated from each other. Even in that case, each light detection element 60a may be disposed at a position where it receives light transmitted through the corresponding one of the filters. The components may be disposed such that light transmitted through the filters enters the light detection elements 60a via a mirror. In that case, each light detection element 60a is not disposed directly below the corresponding one of the filters.

The filters 100 included in the filter array 10 according to this embodiment each have a structure of a resonant cavity. The structure of the resonant cavity refers to a structure in which light with a certain wavelength forms a standing wave and exists stably therein. The resonant cavity illustrated in FIG. 5 includes a first reflective layer 28a, a second reflective layer 28b, and an interference layer 26 between the first reflective layer a and the second reflective layer 28b. There are reflective surfaces at the interface between the first reflective layer 28a and the interference layer 26 and at the interface between the second reflective layer 28b and the interference layer 26. The reflectance of each reflective surface may be, for example, higher than or equal to 10%. The first reflective layer 28a and the second reflective layer 28b may each be formed of at least one selected from the group consisting of a dielectric multilayer film and a metallic thin film. The interference layer 26 may be composed of a dielectric material or semiconductor material that is transparent in a specific wavelength range. The interference layer 26 may be composed of at least one selected from the group consisting of Si, $Si_3N_4$, $TiO_2$, $Nb_2O_5$, and $Ta_2O_5$. The interference layers 26 included in the filters 100 have different refractive indices and/or different thicknesses. The transmission spectrum of each filter 100 has maximum transmittance values at various wavelengths.

The filter array 10 according to this embodiment may include a filter not having the aforementioned resonant cavity. For example, the filter array 10 may include a filter, such as a transparent filter or an ND filter (neutral density filter), not having wavelength dependency with respect to light transmittance.

In this description, each filter 100 having the aforementioned resonant cavity may also be referred to as "Fabry-Perot filter". A Fabry-Perot filter is a type of an interference filter. In place of the Fabry-Perot filters in this embodiment, interference filters of another type, such as color separation filters constituted of diffraction gratings, may be used.

Next, an example of a transmission spectrum of each filter 100 serving as a Fabry-Perot filter will be described. In a case where the thickness of the interference layer 26 is greater than or equal to a predetermined value, the transmission spectrum of the filter 100 has peaks within the target wavelength range W. The peaks may be obtained as a result of a standing wave being formed within the interference layer 26. In this description, a filter having peaks within the target wavelength range W will be referred to as "multimode filter". A multimode filter may be realized by appropriately designing the refractive index of the interference layer 26 instead of the thickness of the interference layer 26. Alternatively, a multimode filter may be realized by appropriately designing both the refractive index and the thickness of the interference layer 26.

Figures 6, 7:
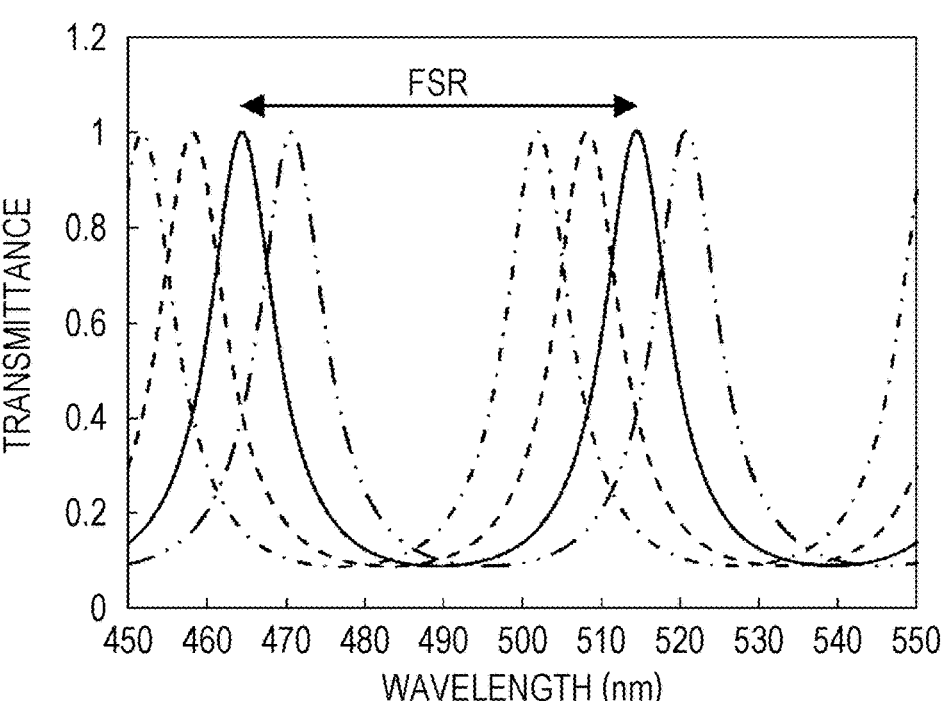
FIG. 6 illustrates an example of a transmission spectrum that a Fabry-Perot filter has.
FIG. 7 illustrates transmission spectra that 16 types of multimode filters according to a comparative example have.

FIG. 6 illustrates an example of a transmission spectrum that each filter 100 has. For illustrative purposes, the peaks in the transmission spectrum are expressed with Lorenz functions in FIG. 6. The same applies to other drawings that illustrate transmission spectra hereinafter. The transmission spectrum illustrated in FIG. 6 is a simplified version of a transmission spectrum of an actual Fabry-Perot filter. An example of a transmission spectrum of an actual Fabry-Perot filter will be described later. In the example illustrated in FIG. 6, when the interference layer 26 is reduced in thickness with reference to a transmission spectrum indicated with a solid line, the transmission spectrum shifts toward the shorter wavelength side, as indicated with a dashed line and a single-dot chain line. When the interference layer 26 is increased in thickness, the transmission spectrum shifts toward the longer wavelength side, as indicated with a double-dot chain line. Even when the thickness of the interference layer 26 varies, an interval FSR between neighboring peaks in the transmission spectrum is uniform, and FSR=50 nm.

Before describing the specific characteristics of the filter array 10 according to this embodiment, a filter array according to a comparative example will be described with reference to FIGS. 7 and 8. The filter array according to the comparative example includes 1,000,000 two-dimensionally-arranged filters. The 1,000,000 filters include 16 types of multimode filters arranged in a random distribution or a semi-random distribution.

FIG. 7 illustrates transmission spectra that the 16 types of multimode filters according to the comparative example have. The 16 types of multimode filters according to the comparative example have interference layers 26 that slightly vary in thickness. In the example illustrated in FIG. 7, the target wavelength range W that is greater than or equal to 450 nm and less than or equal to 550 nm is split into 10 wavelength ranges. Each wavelength range will be referred to as "band" hereinafter. The width of each band is 10 nm. The 10 bands will be referred to as band 1, band 2, . . . , and band 10 in that order from the shorter wavelength side. By gradually varying the thickness of the interference layer 26 among the filters 100, the interval between the peaks in the transmission spectrum indicated with a solid line can be compensated for by the peaks in the remaining 15 types of transmission spectra, as illustrated in FIG. 7. The 16 types of multimode filters in the comparative example all have the same FSR. In other words, the filter array according to the comparative example has a uniform FSR. The FSR in this example is equivalent to five bandwidths.

According to the study of the present inventors, it is discovered that, when spectral images for individual bands are generated by a light detection system equipped with the filter array according to the comparative example, the spectral images for some bands cannot be generated properly. This problem will be described below.

Figure 8:
FIG. 8 illustrates an example of ground truth images and an example of spectral images generated in a reconstruction process by a filter array according to the comparative example having a uniform free spectral range (FSR)

FIG. 8 illustrates an example of ground truth images of the individual bands obtained when a reconstruction process is properly performed, and an example of spectral images of the individual bands generated in a reconstruction process by the light detection system equipped with the filter array according to the comparative example having the uniform FSR. As illustrated in the upper part of FIG. 8, the ground truth images in this example have pixel values exceeding the noise level only with respect to wavelengths in band 1. In contrast, the spectral images generated by the light detection system equipped with the filter array according to the comparative example have pixel values exceeding the noise level not only with respect to band 1 but also with respect to band 6. These spectral images significantly differ from the ground truth images. If the filters all have the uniform FSR, the transmission spectra of all the filters behave similarly every time the wavelength shifts by the FSR, as illustrated in FIG. 7. In other words, the transmission spectra of all the filters in the comparative example change in a uniform cycle within the target wavelength range W. For example, the transmission spectrum indicated with a thick solid line has peaks in band 1 and band 6, and the transmission spectrum indicated with a thick dashed line has peaks in band 3 and band 8.

Referring to the example illustrated in FIG. 7, in the matrix H in Expression (1), components corresponding to band 1 to band 5 are substantially identical to components corresponding to band 6 to band 10. As a result, the spectral images that should be generated with respect to the original bands may also be generated with respect to different bands.

This is due to the fact that, in a case where components corresponding to bands in the matrix H are identical or equivalent to each other, the image data f may possibly reach an incorrect local solution instead of an optimal solution in the recursive iterative operation in Expression (2). The smaller the difference in the components corresponding to the bands in the matrix H, the higher the possibility in which the image data f reaches a local solution.

Accordingly, in the filter array according to the comparative example having the uniform FSR, it is not easy to properly generate spectral images in a reconstruction process in the target wavelength range W that is wider than the FSR. Therefore, the target wavelength range W of a hyperspectral camera is limited to the FSR or smaller.

Thus, in order to solve the aforementioned problem, the present inventors have conceived of the configuration of the filter array 10 according to this embodiment. An example of the filter array 10 according to this embodiment will be described below with reference to FIGS. 9 to 12. The filter array 10 according to this embodiment can reduce the possibility in which the image data f reaches a local solution. Therefore, for example, more accurate spectral images can be generated even in a case where the target wavelength range W of a hyperspectral camera is expanded to the FSR or larger.

Figure 9:
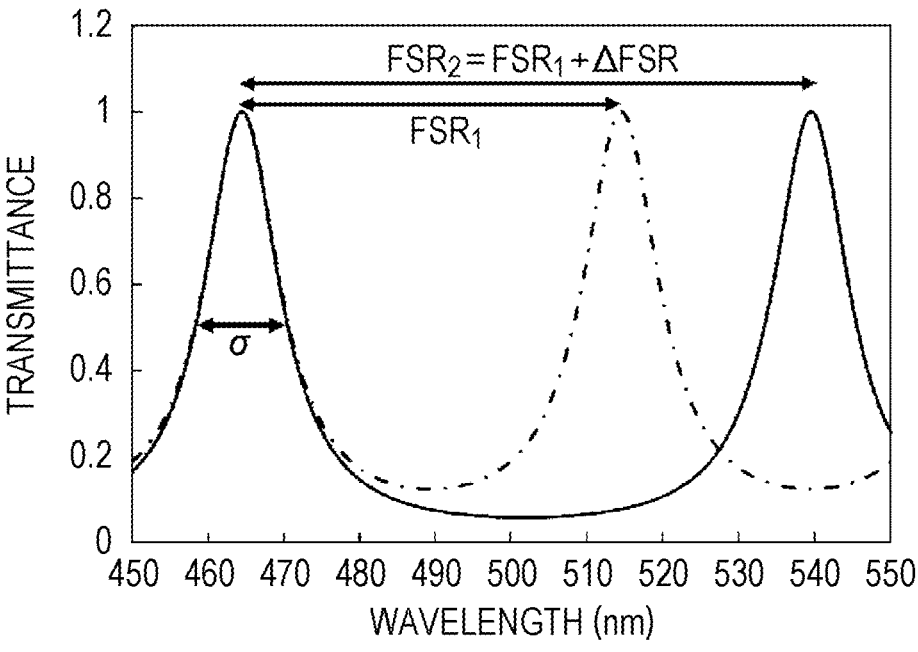
FIG. 9 schematically illustrates an example of transmission spectra of Fabry-Perot filters.

FIG. 9 illustrates an example of transmission spectra of two of the filters 100 in the filter array 10 according to this embodiment. The filter array 10 includes first filters and second filters. The transmission spectra of the first filters are different from each other but have a common peak interval $FSR_1$. Likewise, the transmission spectra of the second filters are different from each other but have a common peak interval $FSR_2$. The transmission spectrum indicated with a single-dot chain line in FIG. 9 is an example of the transmission spectrum of one of the first filters. This transmission spectrum has peaks including a first peak and a second peak that are adjacent to each other. The interval between the first peak and the second peak is $FSR_1$. The transmission spectrum indicated with a solid line in FIG. 9 is an example of the transmission spectrum of one of the second filters. This transmission spectrum has peaks including a third peak and a fourth peak that are adjacent to each other. Of these peaks, the wavelength at the third peak is closest to the wavelength at the first peak. The interval between the third peak and the fourth peak is $FSR_2$. An absolute value of a difference between $FSR_1$ and $FSR_2$ will be defined as $\Delta FSR$, and a half-width of the first peak will be defined as a. In the example illustrated in FIG. 9, $FSR_2=FSR_1+\Delta FSR>FSR_1$. In detail, $FSR_1=50$ nm, $FSR_2=75$ nm, and $\sigma=12$ nm.

In this description, as mentioned above, the filters in which the peak intervals in the transmission spectra are $FSR_1$ and $FSR_2$ are referred to as "first filters" and "second filters". The interference layers included in the first filters and the second filters will be referred to as "first interference layer" and "second interference layer", respectively. Two reflective surfaces at the opposite sides of the first interference layer will be referred to as "first reflective surface" and "second reflective surface", respectively, and two reflective surfaces at the opposite sides of the second interference layer will be referred to as "third reflective surface" and "fourth reflective surface", respectively.

By gradually varying the thickness of the interference layer 26, 16 types of multimode filters including eight types of first filters with different transmission spectra and eight types of second filters with different transmission spectra can be obtained, similarly to the example illustrated in FIG. 7. For example, the filter array 10 may include 16 types of multimode filters in a random distribution or semi-random distribution having two FSRs. Accordingly, the filter array 10 according to this embodiment includes first filters with different transmission spectra and second filters with different transmission spectra. The transmission spectra of the first filters have similar shapes that are shifted toward the shorter wavelength side or the longer wavelength side. The same applies to the transmission spectra of the second filters.

Figure 10:
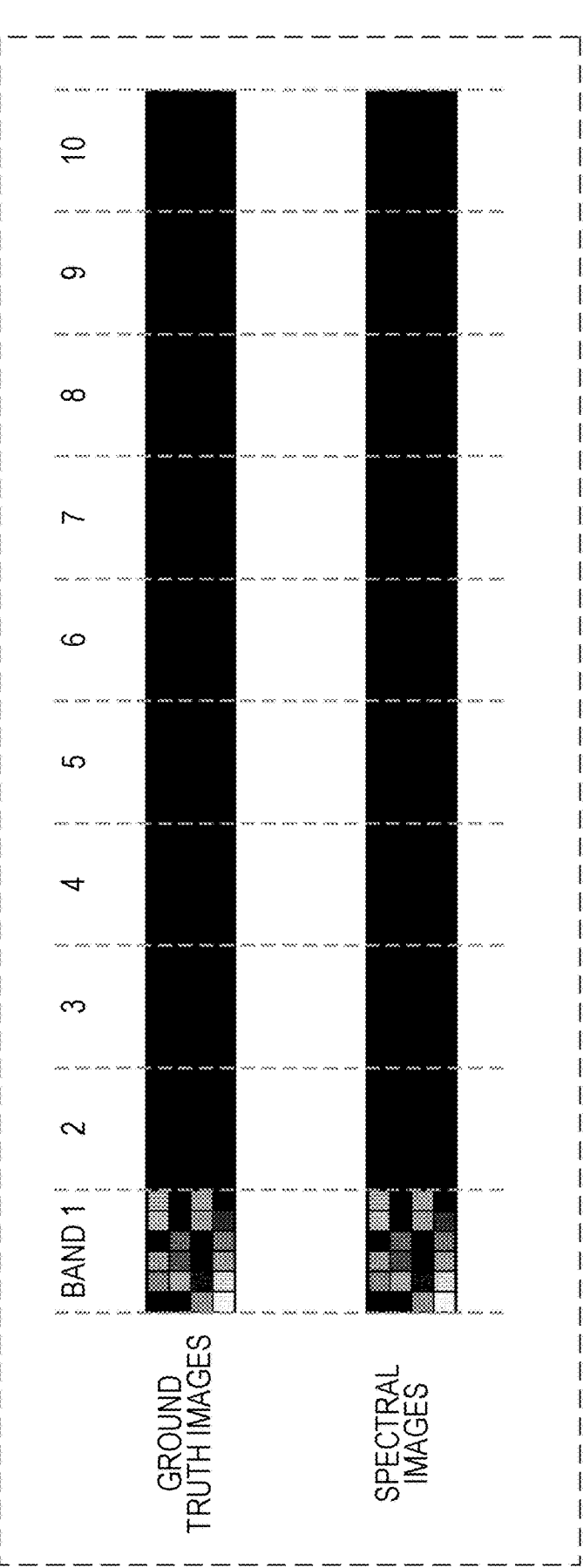
FIG. 10 illustrates an example of ground truth images and an example of spectral images generated in a reconstruction process by a filter array having two FSRs.

FIG. 10 illustrates an example of ground truth images and an example of spectral images generated in a reconstruction process by the light detection system 400 equipped with the filter array 10 according to this embodiment. In the example illustrated in FIG. 10, the first filters and the second filters included in the filter array 10 satisfy the conditions $FSR_1=50$ nm, $FSR_2=75$ nm, and $\sigma=12$ nm, similarly to the example illustrated in FIG. 9. Unlike the example illustrated in the lower part of FIG. 8, in the example illustrated in the lower part of FIG. 10, the entire spectral image with respect to band 6 is substantially black, similar to the ground truth image, and a spectral image having pixel values exceeding the noise level is obtained only with respect to band 1. In the filter array 10 according to this embodiment, the transmission spectra of all the filters 100 do not change in a uniform cycle. Accordingly, the possibility in which components corresponding to the bands in the matrix H in Expression (1) are identical or equivalent to each other can be suppressed. As a result, the filter array 10 according to this embodiment having FSRs can avoid a local solution and generate spectral images in a reconstruction process more accurately.

Figure 11:
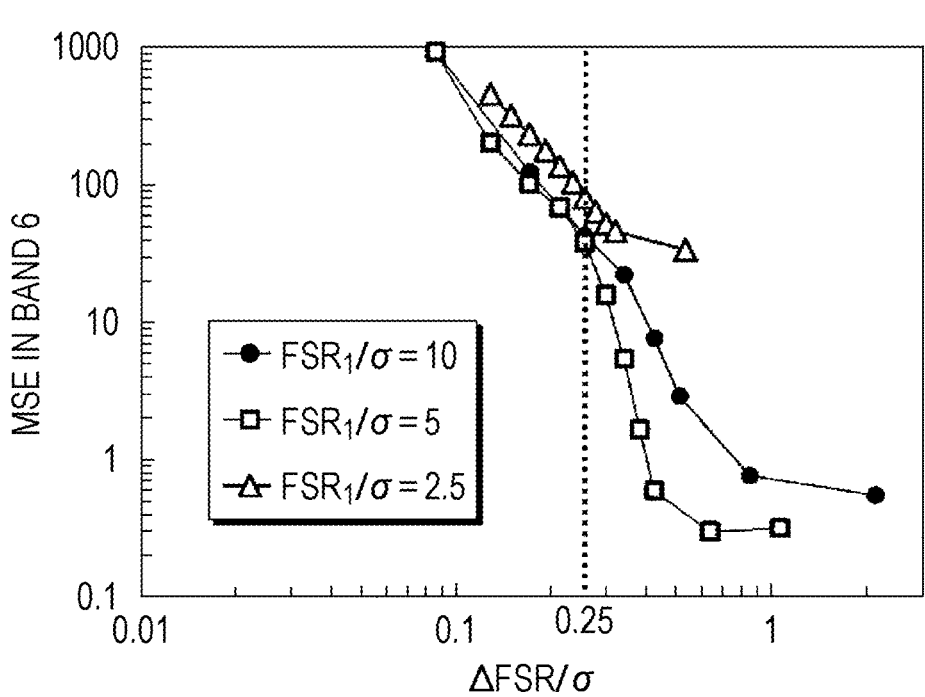
FIG. 11 illustrates the relationship between a mean squared error between a ground truth image and a spectral image and $\Delta FSR/\sigma$ in band 6 where a local solution occurs in the comparative example.

FIG. 11 illustrates an example of the relationship between a mean squared error (MSE) of a spectral image relative to a ground truth image and $\Delta FSR/\sigma$ in band 6 where a local solution occurs in the comparative example. The mean squared error is calculated by using Expression (3) indicated below:

$$MSE = \frac{1}{N \cdot M}\sum_{i=1}^{N}\sum_{j=1}^{M}\left(I'_{i,j} - I_{i,j}\right)^2 \tag{3}$$

In this case, N and M denote the number of pixels in the horizontal direction and the vertical direction, respectively. $I_{i,j}$ denotes a pixel value of a ground truth image with respect to a pixel at a position (i, j). $I'_{i,j}$ denotes a pixel value of a spectral image with respect to a pixel at the position (i, j).

In the example illustrated in FIG. 11, a black dot, a white rectangle, and a white triangle indicate relationships in a case where $FSR_1/\sigma=10$, $FSR_1/\sigma=5$, and $FSR_1/\sigma=2.5$, respectively. $\Delta FSR=0$ corresponds to a case where a filter array having a uniform FSR is used. As illustrated in FIG. 11, the MSE in band 6 increases as $\Delta FSR/\sigma$ decreases. In other words, the possibility in which the image data fin Expression (2) reaches a local solution increases as $\Delta FSR/\sigma$ decreases. When $\Delta FSR/\sigma<0.25$, the MSE is hardly dependent on $FSR_1/\sigma$ and is dependent on $\Delta FSR/\sigma$. In contrast, when $\Delta FSR/\sigma\geq0.25$, the MSE is dependent on both $FSR_1/\sigma$ and $\Delta FSR/\sigma$. When $\Delta FSR/\sigma\geq0.25$ and $FSR_1/\sigma>5$, the MSE effectively decreases together with increasing $\Delta FSR/\sigma\geq$ and becomes less than or equal to 10.

Accordingly, when $\Delta FSR/\sigma\geq0.25$, the filter array 10 having the FSRs can advantageously avoid a local solution. As a result, spectral images can be generated in a reconstruction process more accurately in the target wavelength range W that is wider than $FSR_1$ and $FSR_2$. The filter array 10 according to this embodiment having the FSRs can expand the target wavelength range W of a hyperspectral camera to a range larger than or equal to the largest FSR of the FSRs.

Figure 12:
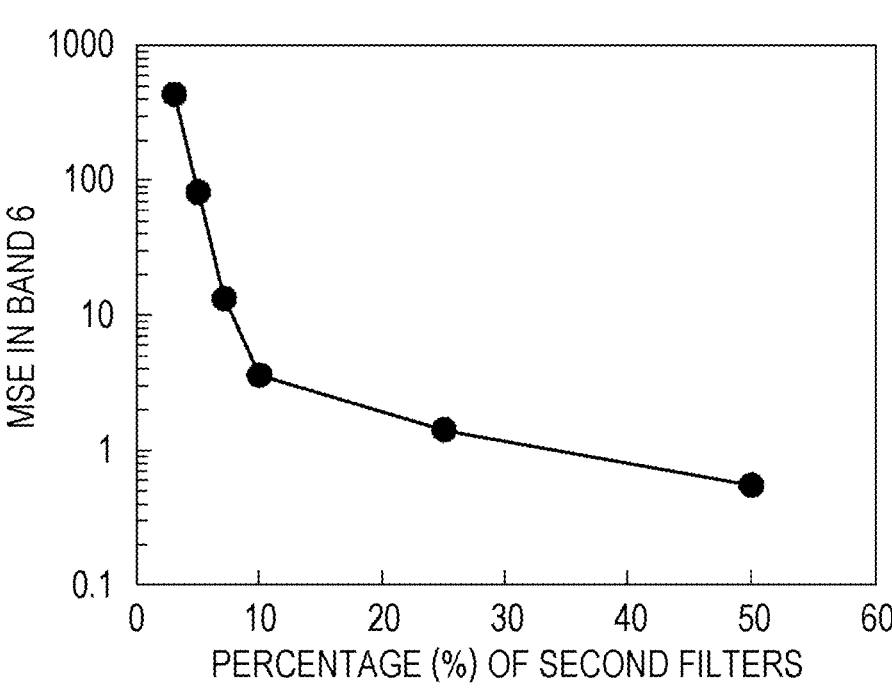
FIG. 12 illustrates the relationship between a mean squared error between a ground truth image and a spectral image in band 6 and the percentage of second filters included in the filter array.

FIG. 12 illustrates an example of the relationship between the MSE of a spectral image relative to a ground truth image in band 6 and the percentage of second filters included in the filter array 10. The percentage of second filters included in the filter array 10 is the percentage of the number of second filters relative to the sum of the number of first filters and the number of second filters included in the filter array 10. For example, if the percentage of the second filters included in the filter array 10 is 10%, the ratio between the number of first filters in the filter array 10 and the number of second filters is 9:1. If the percentage of the second filters included in the filter array 10 is 50%, the ratio between the number of first filters in the filter array 10 and the number of second filters is 5:5.

As illustrated in FIG. 12, when the percentage of the second filters included in the filter array 10 falls below 10%, the MSE rapidly increases. Therefore, when the percentage of the second filters included in the filter array 10 is higher than or equal to 10%, a local solution is avoided, and the possibility in which spectral images can be generated in a reconstruction process more accurately increases.

Figure 13:
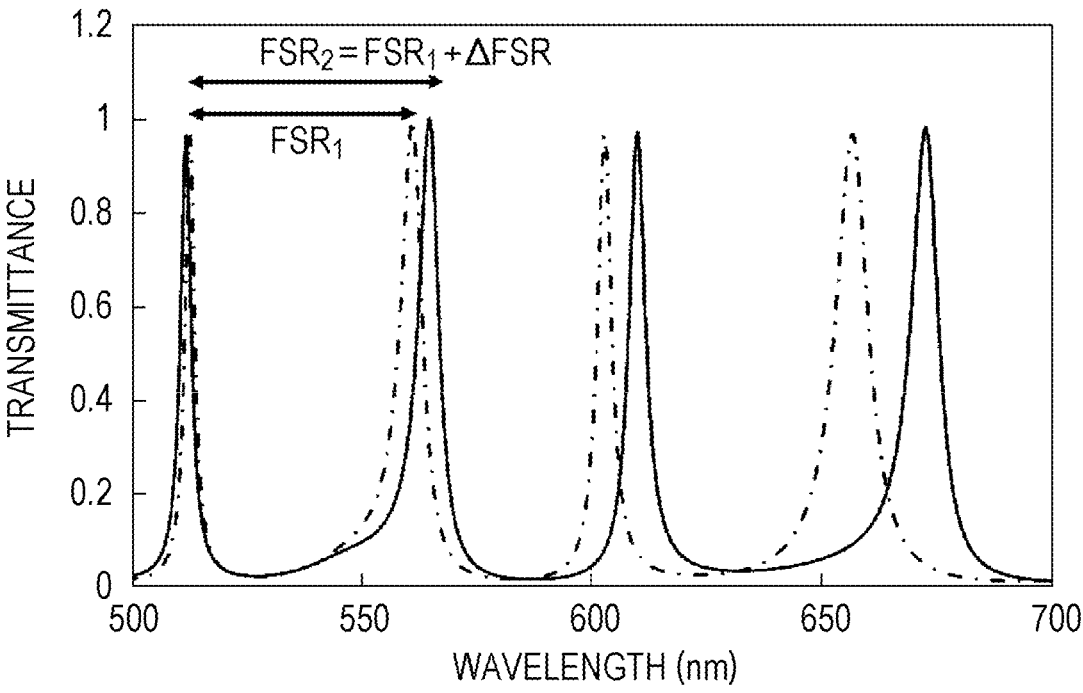
FIG. 13 illustrates a calculation result of transmission spectra that the Fabry-Perot filters according to the embodiment have.

Next, a specific example of transmission spectra that two of the filters 100 in the filter array 10 according to this embodiment have will be described with reference to FIG. 13. FIG. 13 illustrates an example of transmission spectra that the filters 100 according to this embodiment have. The first reflective layer 28a and the second reflective layer 28b of each filter 100 in this example are each formed of a dielectric multilayer film having $TiO_2$ and $SiO_2$ layers alternately stacked one on top of each other. The interference layer 26 in the filter 100 is formed of a $TiO_2$ layer. Each transmission spectrum is calculated by using DiffractMOD as an analysis tool based on RCWA (rigorous coupled-wave analysis) of RSoft, Inc.

A solid line and a single-dot chain line illustrated in FIG. 13 indicate transmission spectra of Fabry-Perot filters in which the thickness of the interference layer 26 is 633 nm and 750 nm, respectively. The filter in which the thickness of the interference layer 26 is 633 nm has a larger FSR than the filter in which the thickness of the interference layer 26 is 750 nm. The filter in which the thickness of the interference layer 26 is 750 nm is a first filter, whereas the filter in which the thickness of the interference layer 26 is 633 nm is a second filter.

In the example illustrated in FIG. 13, $\Delta FSR=5$ nm, and the half-width $\sigma=14$ nm. $\Delta FSR/\sigma=0.36$ satisfies $\Delta FSR/\sigma\geq0.25$ serving as a condition for generating a spectral image in a reconstruction process in a certain wavelength range more accurately.

In an actual Fabry-Perot filter, the peak half-width $\sigma$ may vary depending on the thickness of the interference layer 26 and the wavelength range. A peak half-width $\sigma$ that satisfies $\Delta FSR/\sigma\geq0.25$ is a half-width of a first peak existing in a noteworthy wavelength range among peaks that the first filters and the second filters included in the filter array 10 have. The noteworthy wavelength range is band 6 in the example illustrated in FIG. 11. Although the half-width of the first peak in the transmission spectrum of each first filter in the filter array 10 is defined as $\sigma$ in this embodiment, the maximum half-width among peak half-widths of the transmission spectra of all the filters may be defined as a.

In a case where the first filters with different transmission spectra are to be realized by gradually varying the thickness of the interference layer 26, the FSRs that the first filters have may vary to some extent in actuality. Even in that case, when the maximum value and the minimum value of the FSRs that the first filters have are defined as $FSR_{1max}$ and $FSR_{1min}$, respectively, if $(FSR_{1max}-FSR_{1min})/\sigma<0.25$, it is conceivable that the first filters all have the same $FSR_1$. The same applies to $FSR_2$ that the second filters have.

Alternatively, it is also conceivable from the above-described result that filters corresponding to $\Delta FSR/\sigma<0.25$ all belong to the first filters and that filters corresponding to $\Delta FSR/\sigma\geq0.25$ belong to the second filters. In this case, when the percentage of second filters is higher than or equal to 10%, spectral images can be generated in a reconstruction process more accurately in the target wavelength range W exceeding the FSR.

Next, modifications of the light detection device 300 illustrated in FIG. 5 will be described with reference to FIGS. 14A to 14F.

FIGS. 14A to 14F schematically illustrate modifications of the light detection device 300 in FIG. 5.

Figure 14A:
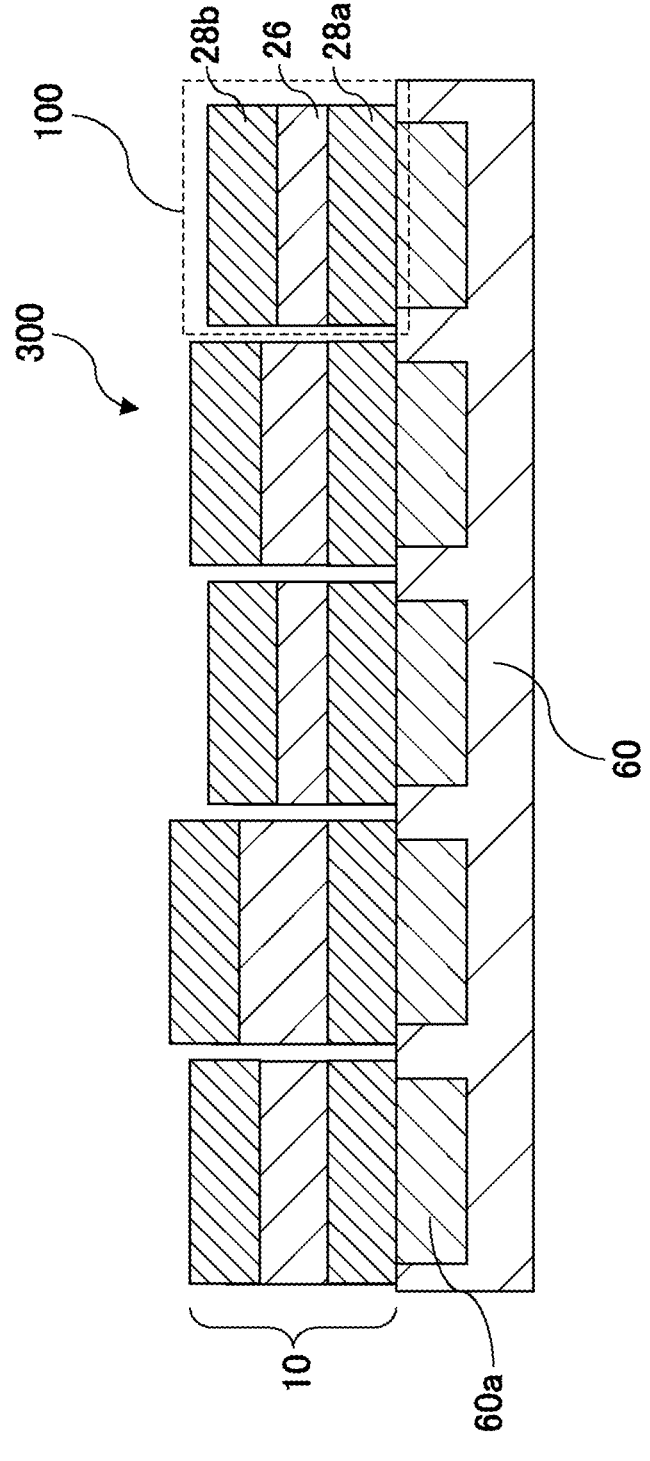
FIG. 14A schematically illustrates a first modification of the light detection device.

As illustrated in FIG. 14A, in the filter array 10, the filters 100 may be segmented. Not all the filters 100 have to be segmented. One or more of the filters 100 may be segmented.

Figure 14B:
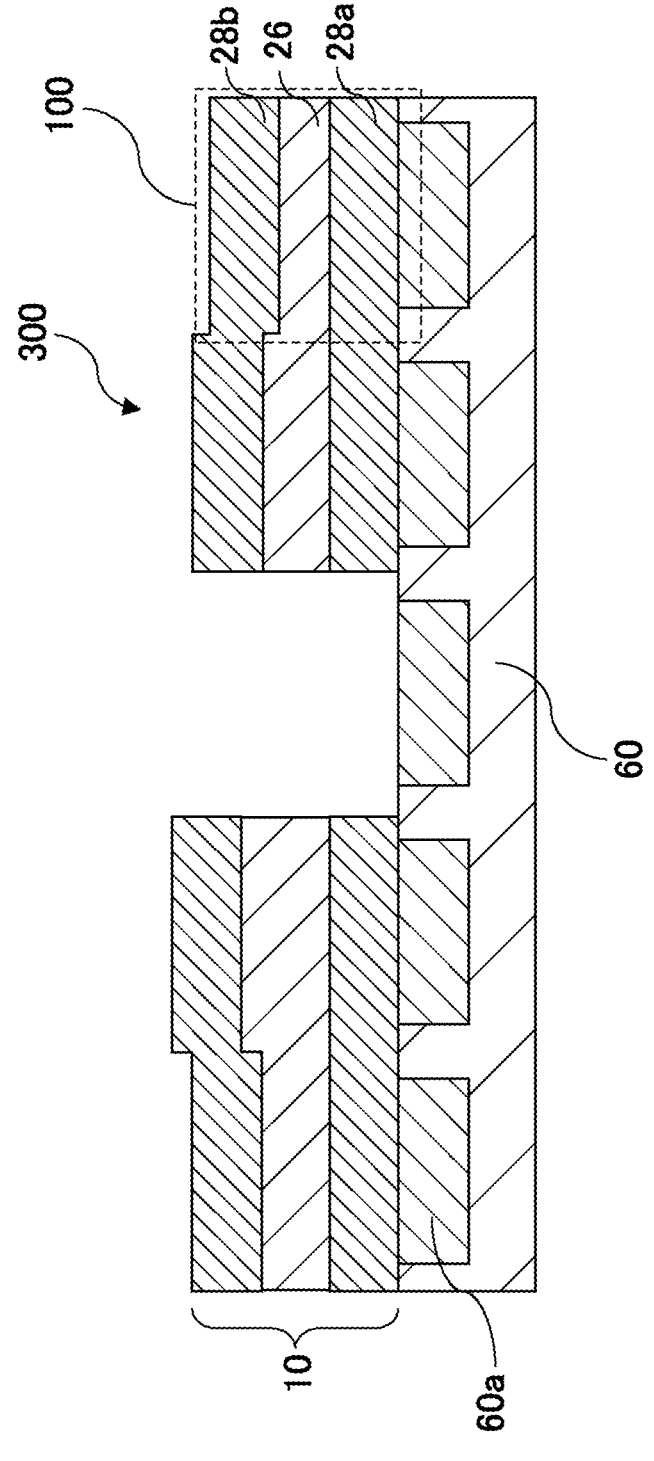
FIG. 14B schematically illustrates a second modification of the light detection device.

As illustrated in FIG. 14B, the filters 100 do not have to be disposed on one or more of the light detection elements 60a. In other words, in the filter array 10, at least one of the filters 100 may be transparent.

Figure 14C:
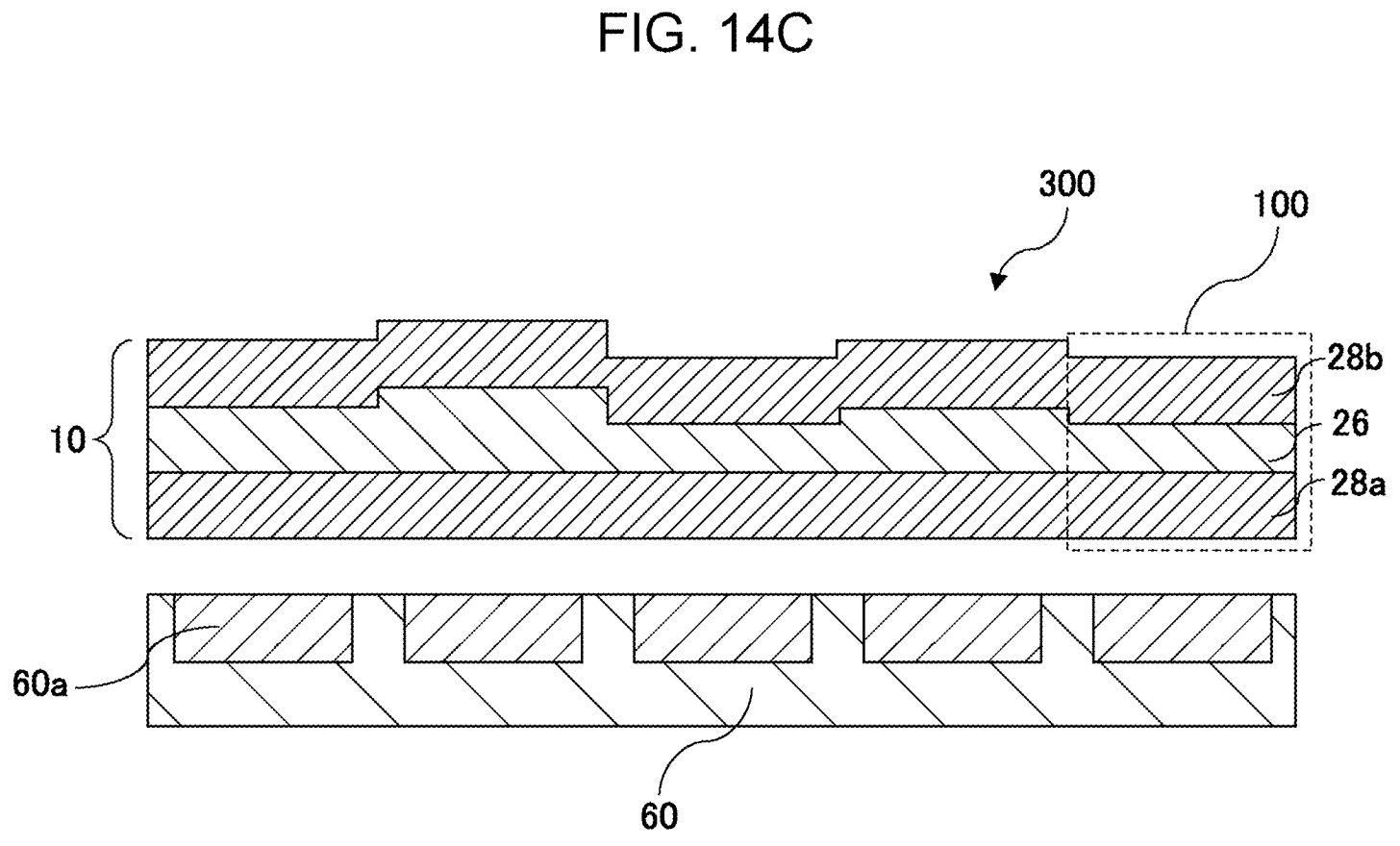

As illustrated in FIG. 14C, the filter array 10 and the image sensor 60 may have a space provided therebetween. In other words, the filter array 10 and the image sensor 60 may be separated from each other by a space.

Figure 14D:
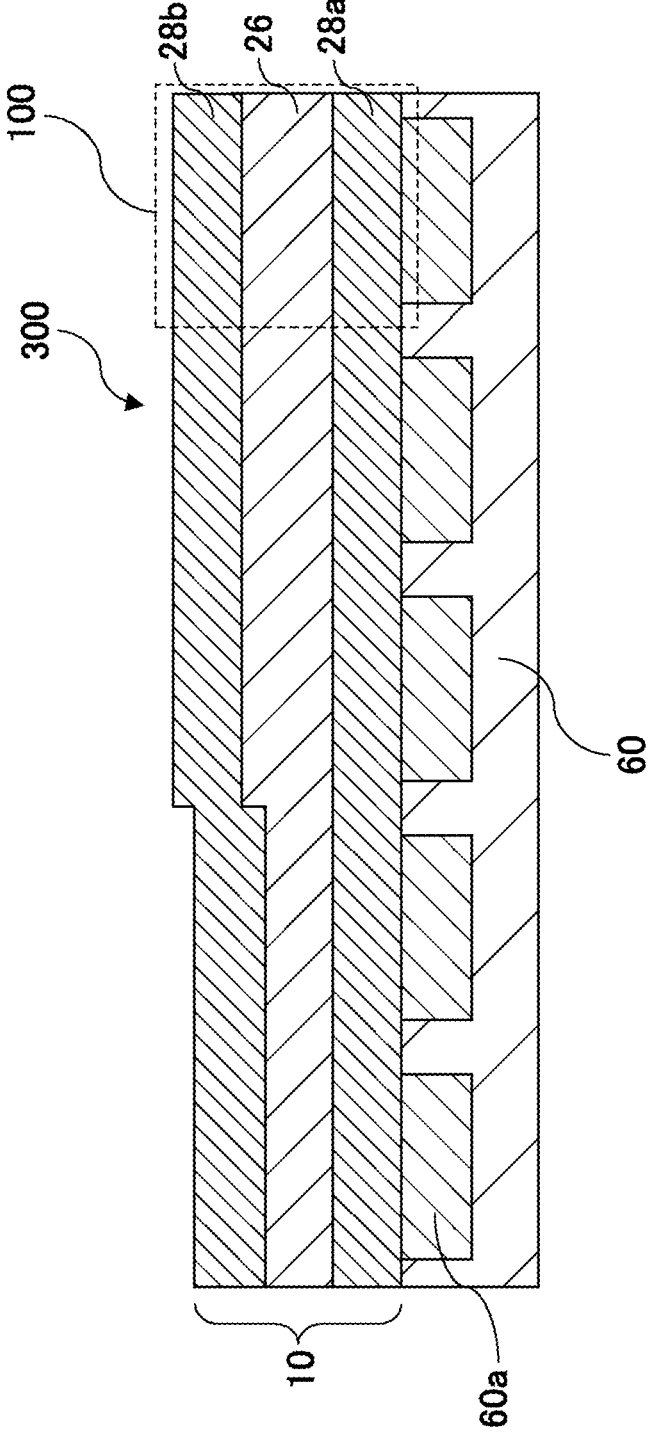
FIG. 14D schematically illustrates a fourth modification of the light detection device.

As illustrated in FIG. 14D, one filter 100 may be disposed astride light detection elements 60a. In other words, the interference layer 26 may be provided continuously astride two or more filters 100. The first reflective layer 28a and/or the second reflective layer 28b may be provided continuously astride two or more filters 100.

Figure 14E:
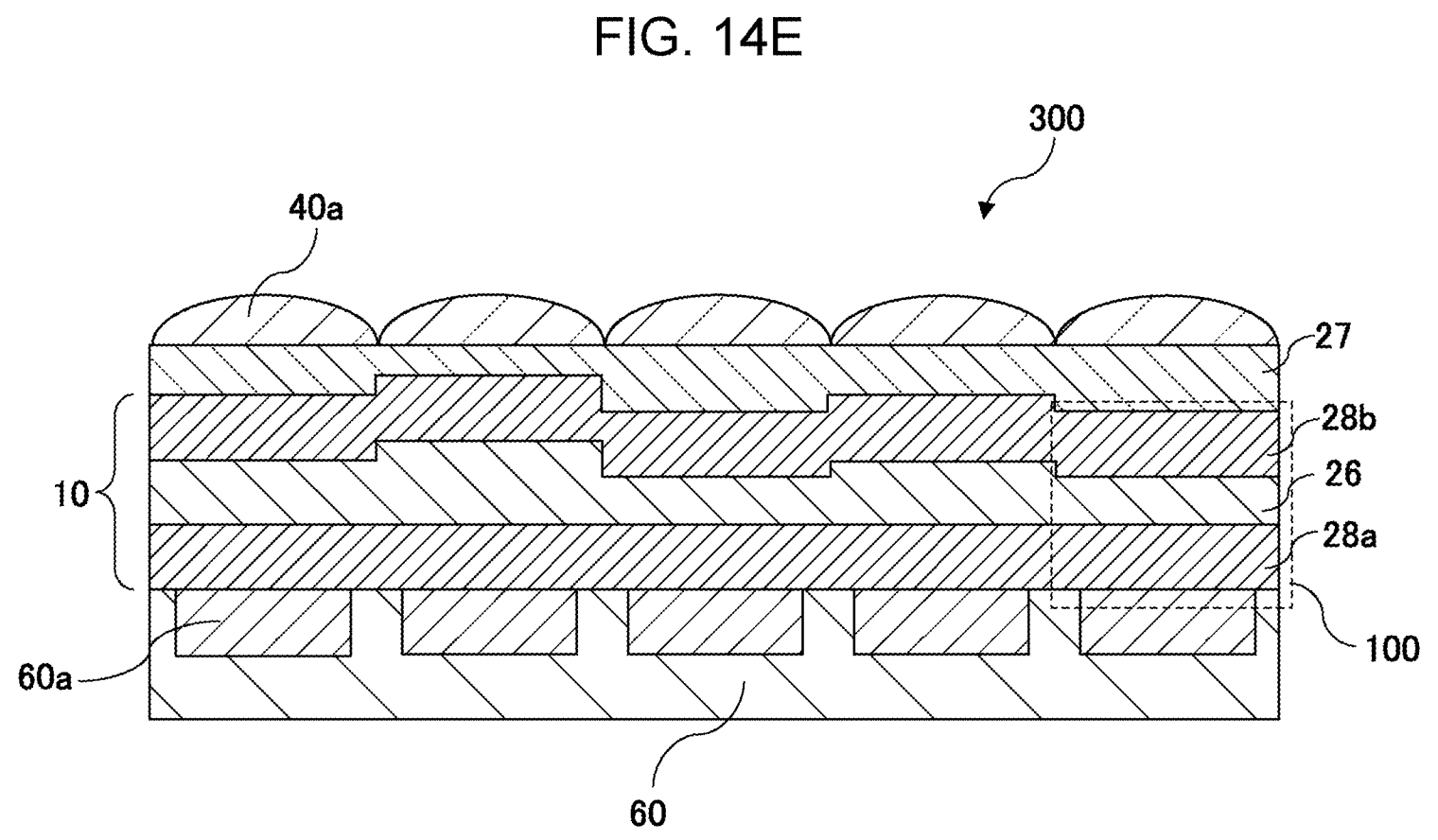
Figure 14F:
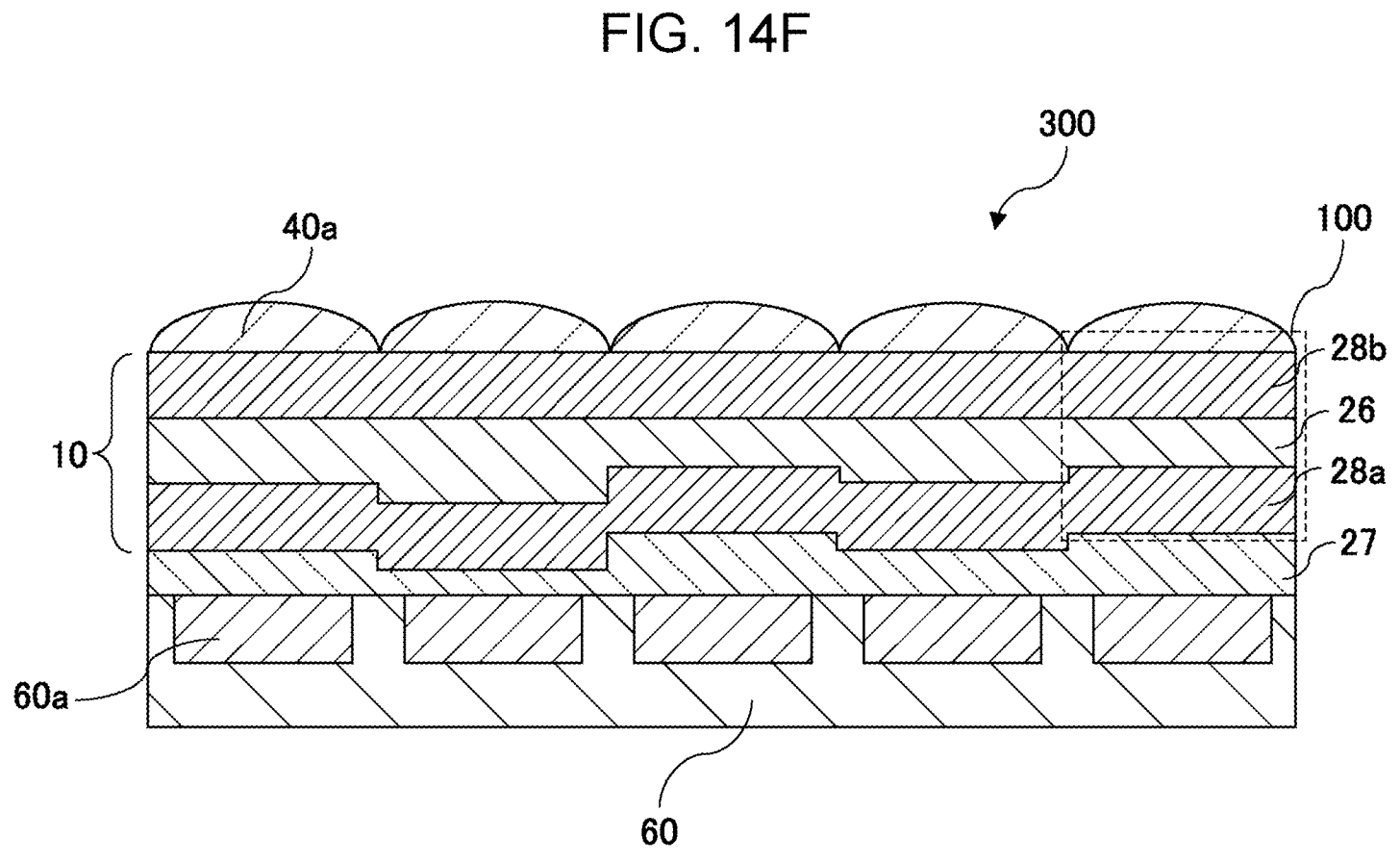

As illustrated in FIGS. 14E and 14F, a transparent layer 27 may be disposed to flatten out the unevenness of the filter array 10. In other words, the filter array 10 may further include a transparent layer 27 that flattens out the unevenness between two or more filters 100 each having the aforementioned resonant cavity. In the example illustrated in FIG. 14E, the upper surface of the second reflective layer 28b of the filter array 10 is uneven. In the example illustrated in FIG. 14F, the lower surface of the first reflective layer 28a of the filter array 10 is uneven. By using the transparent layer 27 to flatten out the unevenness between two or more filters 100, other components can be readily disposed on the transparent layer 27.

As illustrated in FIGS. 14E and 14F, micro-lenses 40a may be disposed on the filter array 10. Each of the micro-lenses 40a is disposed on one filter 100 of the filters 100. In other words, the filter array 10 further includes two or more micro-lenses 40a. Each of the two or more micro-lenses 40a is disposed on one filter 100 of the two or more filters 100 each having the aforementioned resonant cavity. Incident light is collected by the two or more micro-lenses 40a so that the light can be efficiently detected.

The light detection system and the filter array according to the present disclosure may be used in, for example, a camera and a measurement device that acquire a multi-wavelength two-dimensional image. The light detection system and the filter array according to the present disclosure are also applicable to, for example, biological, medical, or cosmetic-oriented sensing, a system for inspecting foreign matter and residual pesticides in food, a remote sensing system, and a vehicular sensing system.

What is claimed is:

1. A filter array comprising:
filters that are disposed in a two-dimensional plane and that have transmission spectra different from each other,
wherein the filters include
a first filter that has a transmission spectrum having a first peak group including a first major peak and a second major peak that are adjacent to each other,
at least one second filter that has a transmission spectrum having a second peak group including a third major peak and a fourth major peak that are adjacent to each other, and
a third filter that has a transmission spectrum having a fifth major peak and a sixth major peak that are adjacent to each other,
wherein, of major peaks included in the second peak group, the third major peak has a wavelength that is closest to a wavelength at the first major peak,
wherein a first interval between the wavelength at the first major peak and a wavelength at the second major peak is different from a second interval between the wavelength at the third major peak and a wavelength at the fourth major peak, and
wherein $\Delta FSR/\sigma\geq0.25$, where $\Delta FSR$ denotes an absolute value of a difference between the first interval and the second interval and $\sigma$ denotes a half-width of the first major peak, the half-width of the first major peak representing a wavelength difference between wavelengths corresponding to half of a transmittance at the first major peak,
wherein the transmission spectrum of the third filter is different from the transmission spectrum of the first filter, and
wherein a third interval between a wavelength at the fifth major peak and a wavelength at the sixth major peak is the same as the first interval.

2. The filter array according to claim 1,
wherein the at least one second filter includes second filters, and
wherein a number of the second filters is greater than or equal to 10% of a total number of the filters.

3. The filter array according to claim 1,
wherein the first filter includes a first interference layer having a first reflective surface and a second reflective surface opposite the first reflective surface, and
wherein the first major peak and the second major peak are obtained as a result of a standing wave being formed within the first interference layer.

4. The filter array according to claim 1,
wherein the at least one second filter includes a second interference layer having a third reflective surface and a fourth reflective surface opposite the third reflective surface, and
wherein the third major peak and the fourth major peak are obtained as a result of a standing wave being formed within the second interference layer.

5. The filter array according to claim 1,
wherein $\Delta FSR/\sigma_M\geq0.25$, where $\Delta FSR$ denotes the absolute value of the difference between the first interval and the second interval and $\sigma_M$ denotes a half-width of a major peak with a maximum half-width among major peaks included in the first peak group and the major peaks included in the second peak group, the half-width of the major peak with the maximum half-width representing a wavelength difference between wavelengths corresponding to half of a transmittance at the major peak with the maximum half-width.

6. A light detection system comprising:
a filter array, the filter array including filters that are disposed in a two-dimensional plane and that have transmission spectra different from each other;
an image sensor that is disposed at a position where the image sensor receives light transmitted through the filters; and
a processing circuit that generates sets of spectral image data corresponding one-to-one to wavelength bands based on data indicating a spatial distribution of the transmission spectra of the filters and image data acquired by the image sensor,
wherein the filters include
a first filter that has a transmission spectrum having a first peak group including a first major peak and a second major peak that are adjacent to each other,
at least one second filter that has a transmission spectrum having a second peak group including a third major peak and a fourth major peak that are adjacent to each other, and
a third filter that has a transmission spectrum having a fifth major peak and a sixth major peak that are adjacent to each other,
wherein, of major peaks included in the second peak group, the third major peak has a wavelength that is closest to a wavelength at the first major peak,
wherein a first interval between the wavelength at the first major peak and a wavelength at the second major peak is different from a second interval between the wavelength at the third major peak and a wavelength at the fourth major peak, wherein ΔFSR/σ>0.25, where ΔFSR denotes an absolute value of a difference between the first interval and the second interval and σ denotes a half-width of the first major peak, the half-width of the first major peak representing a wavelength difference between wavelengths corresponding to half of a transmittance at the first major peak,
wherein the transmission spectrum of the third filter is different from the transmission spectrum of the first filter,
wherein a third interval between a wavelength at the fifth major peak and a wavelength at the sixth major peak is same as the first interval,
wherein each of the sets of the spectral image data includes n pixel values in a horizontal direction and m pixel values in a vertical direction,
wherein a number of the wavelength bands is w, and
wherein the data indicating the spatial distribution of the transmission spectra of the filters corresponds to H being a matrix of num rows and n×m×w columns.

7. The light detection system according to claim 6,
wherein the image sensor includes a first detection element and a second detection element,
wherein the first detection element detects light that has a spectrum having the first major peak and the second major peak, and
wherein the second detection element detects light that has a spectrum having the third major peak and the fourth major peak.

* * * * *